US009049576B2

(12) United States Patent
Arsenault et al.

(10) Patent No.: US 9,049,576 B2
(45) Date of Patent: *Jun. 2, 2015

(54) METHODS AND SYSTEMS FOR ENABLING END-USER EQUIPMENT AT AN END-USER PREMISE TO EFFECT COMMUNICATIONS HAVING CERTAIN DESTINATIONS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

(75) Inventors: Jonathan Allan Arsenault, Orleans (CA); David William Clark, Carp (CA); Eric John Wolf, Stittsville (CA); Sean MacLean Murray, Ottawa (CA)

(73) Assignee: BCE Inc., Montreal (CA)

( * ) Notice: Subject to any disclaimer, the term of this patent is extended or adjusted under 35 U.S.C. 154(b) by 271 days.

This patent is subject to a terminal disclaimer.

(21) Appl. No.: 12/452,278
(22) PCT Filed: Dec. 23, 2008
(86) PCT No.: PCT/CA2008/002280
§ 371 (c)(1),
(2), (4) Date: Dec. 23, 2009

(87) PCT Pub. No.: WO2010/071959
PCT Pub. Date: Jul. 1, 2010

(65) Prior Publication Data
US 2011/0211440 A1   Sep. 1, 2011

(51) Int. Cl.
*H04L 12/703* (2013.01)
*H04W 4/16* (2009.01)
(Continued)

(52) U.S. Cl.
CPC ............... *H04W 4/16* (2013.01); *H04L 41/06* (2013.01); *H04L 41/5054* (2013.01); *H04L 41/5064* (2013.01); *H04W 88/04* (2013.01)

(58) Field of Classification Search
CPC ............... H04L 41/06–41/0627; H04L 41/0654–41/0668; H04L 45/22; H04L 45/28

USPC ......... 370/216–228, 252, 253, 352–356, 465, 370/466; 379/32.01–33, 37–51
See application file for complete search history.

(56) References Cited

U.S. PATENT DOCUMENTS 6,608,557 B1    8/2003   Menard et al.
6,829,478 B1    12/2004  Layton et al.
(Continued)

FOREIGN PATENT DOCUMENTS

WO   WO 00/75900 A1   12/2000
WO   WO 2006/011162 A1   2/2006

OTHER PUBLICATIONS

News Report, "Emergency Alerting Server Sends Critical Alerts Over SMS and Wi-Fi", Sep. 12, 2008, www.govtech.com/em/articles/409877, 2 pages.   (Continued)

*Primary Examiner* — Pao Sinkantarakorn
(74) *Attorney, Agent, or Firm* — Gowling Lafleur Henderson LLP

(57) ABSTRACT

A method for effecting communications, such as telephone calls, accesses to data network sites (e.g., web sites), alarm system communications, and/or other communications, having certain destinations over a communications network. The method comprises: receiving a request for a communication originated by first end-user equipment at a first end-user premise when an ability of the first end-user equipment to communicate via a first communication link connecting the first end-user equipment to the communications network is disrupted; determining, based on a destination of the communication, that the communication is to be effected over the communications network; and causing information pertaining to the communication to be exchanged between the first end-user equipment and the communications network via a wireless communication link established between the first end-user equipment and second end-user equipment at a second end-user premise and a second communication link connecting the second end-user equipment to the communications network. Also provided are apparatus and computer-readable media containing a program element executable by a computing system to perform such a method.

40 Claims, 8 Drawing Sheets

(51) Int. Cl.
*H04L 12/24* (2006.01)
*H04W 88/04* (2009.01)

(56) References Cited

U.S. PATENT DOCUMENTS

| | | | |
|---|---|---|---|
| 6,960,998 | B2 | 11/2005 | Menard et al. |
| 7,079,020 | B2 | 7/2006 | Stilp |
| 8,223,951 | B1 | 7/2012 | Edelhaus et al. |
| 8,630,163 | B1 | 1/2014 | Varghis et al. |
| 2002/0164996 | A1* | 11/2002 | Dorenbosch ............ 455/456 |
| 2004/0117638 | A1 | 6/2004 | Monroe |
| 2006/0009266 | A1 | 1/2006 | Hara et al. |
| 2006/0176863 | A1* | 8/2006 | Robinson et al. ........ 370/338 |
| 2007/0032230 | A1* | 2/2007 | Pregont ............. 455/421 |
| 2007/0053306 | A1 | 3/2007 | Stevens |
| 2007/0090944 | A1 | 4/2007 | Du Breuil |
| 2008/0080365 | A1 | 4/2008 | Weeresinghe |
| 2008/0310403 | A1 | 12/2008 | Asoh et al. |
| 2009/0003318 | A1 | 1/2009 | Sweeney et al. |
| 2009/0070681 | A1 | 3/2009 | Dawes et al. |
| 2009/0289787 | A1 | 11/2009 | Dawson et al. |
| 2011/0009062 | A1* | 1/2011 | Anschutz et al. ........ 455/41.2 |

OTHER PUBLICATIONS

Voice Products LLC, "Cigarette Smoke Detector: Remote Receivers and Indicators", http://www.vproducts.com/p-long-range-receivers.htm, Jan. 27, 2009, 2 pages.
International Search Report mailed on Aug. 17, 2009 in connection with International Patent Application No. PCT/CA2008/002281.
Written Opinion of the International Searching Authority mailed on Aug. 17, 2009 in connection with International Patent Application No. PCT/CA2008/002281.
International Search Report mailed on Aug. 20, 2009 in connection with International Patent Application No. PCT/CA2008/002282.
Written Opinion of the International Searching Authority mailed on Aug. 20, 2009 in connection with International Patent Application No. PCT/CA2008/002282.
International Search Report mailed on Sep. 24, 2009 in connection with International Patent Application No. PCT/CA2008/002266.
Written Opinion of the International Searching Authority mailed on Sep. 24, 2009 in connection with International Patent Application No. PCT/CA2008/002266.
International Search Report mailed on Aug. 31, 2009 in connection with International Patent Application No. PCT/CA2008/002280.
Written Opinion of the International Searching Authority mailed on Aug. 31, 2009 in connection with International Patent Application No. PCT/CA2008/002280.
International Preliminary Report on Patentability completed on Feb. 24, 2011 in connection with International Patent Application PCT/CA2008/002282, 16 pages.
International Preliminary Report on Patentability completed on May 9, 2011 in connection with International Patent Application PCT/CA2008/002266, 21 pages.
International Preliminary Report on Patentability completed on Feb. 24, 2011 in connection with International Patent Application PCT/CA2008/002281, 21 pages.
Office Action issued on Sep. 30, 2013 in connection with U.S. Appl. No. 13/142,249, 26 pages.
Office Action issued on Nov. 1, 2013 in connection with U.S. Appl. No. 13/141,922, 30 pages.
Office Action issued on Apr. 25, 2013 in connection with U.S. Appl. No. 13/138,031, 37 pages.
Office Action issued on May 29, 2014 in connection with U.S. Appl. No. 13/141,922, 32 pages.

* cited by examiner

METHODS AND SYSTEMS FOR ENABLING END-USER EQUIPMENT AT AN END-USER PREMISE TO EFFECT COMMUNICATIONS HAVING CERTAIN DESTINATIONS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

FIELD OF THE INVENTION

The invention relates generally to telecommunications and, more particularly, to methods and systems for enabling end-user equipment at an end-user premise to effect communications having certain destinations when an ability of the end-user equipment to communicate via a communication link connecting the end-user equipment to a communications network is disrupted.

BACKGROUND

End-user premises such as residences or other buildings (or parts thereof) can be equipped with various pieces of equipment, including phones, computers, alarm system devices and/or other devices (e.g., television units), which can be used to effect telephone calls, accesses to data network sites (e.g., websites), alarm system communications, and/or other communications (e.g., television signals, etc.).

Communications effected by end-user equipment at a given end-user premise take place over a communication link, such as a metallic twisted-pair cable, a coaxial cable, an optic fiber cable, or a wireless link, which reaches the given end-user premise and connects the end-user equipment to a communications network. In some situations, an ability of the end-user equipment to communicate via the communication link can be disrupted. For example, in some cases, the communication link can be disrupted, for instance, due to a cut or other physical damage inflicted (accidentally or maliciously) to the communication link or to any other condition preventing the communication link from operating normally. In other cases, software and/or hardware (e.g., a modem) of the end-user equipment used by the end-user equipment to effect communications via the communication link can be disrupted, for instance, due to a defective or inoperative component. In such situations, it may no longer be possible for the end-user equipment to effect telephone calls, accesses to data network sites, alarm system communications, and/or other communications via the communication link. For certain communications, such as important or emergency phone calls (e.g., "911" calls) or alarm system communications potentially indicative of undesirable events (e.g., an intrusion or a fire at the end-user premise), this difficulty or impossibility to communicate via the communication link may have negative, and in some cases, harmful or fatal consequences.

Accordingly, there exists a need for solutions enabling end-user equipment at an end-user premise to effect telephone calls, accesses to data network sites, alarm system communications, and/or other communications having certain destinations when an ability of the end-user equipment to communicate via a communication link connecting the end-user equipment to a communications network is disrupted.

SUMMARY OF THE INVENTION

According to a first broad aspect, the invention provides a method for effecting communications over a communications network. The method comprises: receiving a request for a communication originated by first end-user equipment at a first end-user premise when an ability of the first end-user equipment to communicate via a first communication link connecting the first end-user equipment to the communications network is disrupted; determining, based on a destination of the communication, that the communication is to be effected over the communications network; and causing information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a second broad aspect, the invention provides apparatus for effecting communications over a communications network. The apparatus comprises a processing entity configured to: receive a request for a communication originated by first end-user equipment at a first end-user premise when an ability of the first end-user equipment to communicate via a first communication link connecting the first end-user equipment to the communications network is disrupted; and determine, based on a destination of the communication, that the communication is to be effected over the communications network. The apparatus also comprises a routing entity configured to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a third broad aspect, the invention provides computer-readable media containing a program element executable by a computing system to perform a method for effecting communications over a communications network. The program element comprises: program code for causing the computing system to receive a request for a communication originated by first end-user equipment at a first end-user premise when an ability of the first end-user equipment to communicate via a first communication link connecting the first end-user equipment to the communications network is disrupted; program code for causing the computing system to determine, based on a destination of the communication, that the communication is to be effected over the communications network; and program code for causing the computing system to cause information pertaining to the communication to be exchanged between the first end-user equipment and the communications network via a wireless communication link established between the first end-user equipment and second end-user equipment at a second end-user premise and a second communication link connecting the second end-user equipment to the communications network.

According to a fourth broad aspect, the invention provides a method for effecting an emergency phone call originated by a telephone at a first end-user premise, the first end-user premise including first end-user equipment connected to a communications network via a first communication link. The method comprises: determining that an ability of the first end-user equipment to communicate via the first communication link is disrupted; determining that the emergency phone call is to be effected over the communications network; establishing a wireless communication link between the first end-user equipment and second end-user equipment at a second end-user premise; and causing information pertaining to the emergency phone call to be transmitted to communication equipment associated with an emergency phone call answering point via the wireless communication link and a second communication link connecting the second end-user equipment to the communications network.

According to a fifth broad aspect, the invention provides apparatus for effecting an emergency phone call originated by a telephone at a first end-user premise, the first end-user premise including first end-user equipment connected to a communications network via a first communication link. The apparatus comprises a processing entity configured to: determine that an ability of the first end-user equipment to communicate via the first communication link is disrupted; and determine that the emergency phone call is to be effected over the communications network. The apparatus also comprises a routing entity configured to: establish a wireless communication link between the first end-user equipment and second end-user equipment at a second end-user premise; and cause information pertaining to the emergency phone call to be transmitted to communication equipment associated with an emergency phone call answering point via the wireless communication link and a second communication link connecting the second end-user equipment to the communications network.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF EMBODIMENTS

Figure 1:
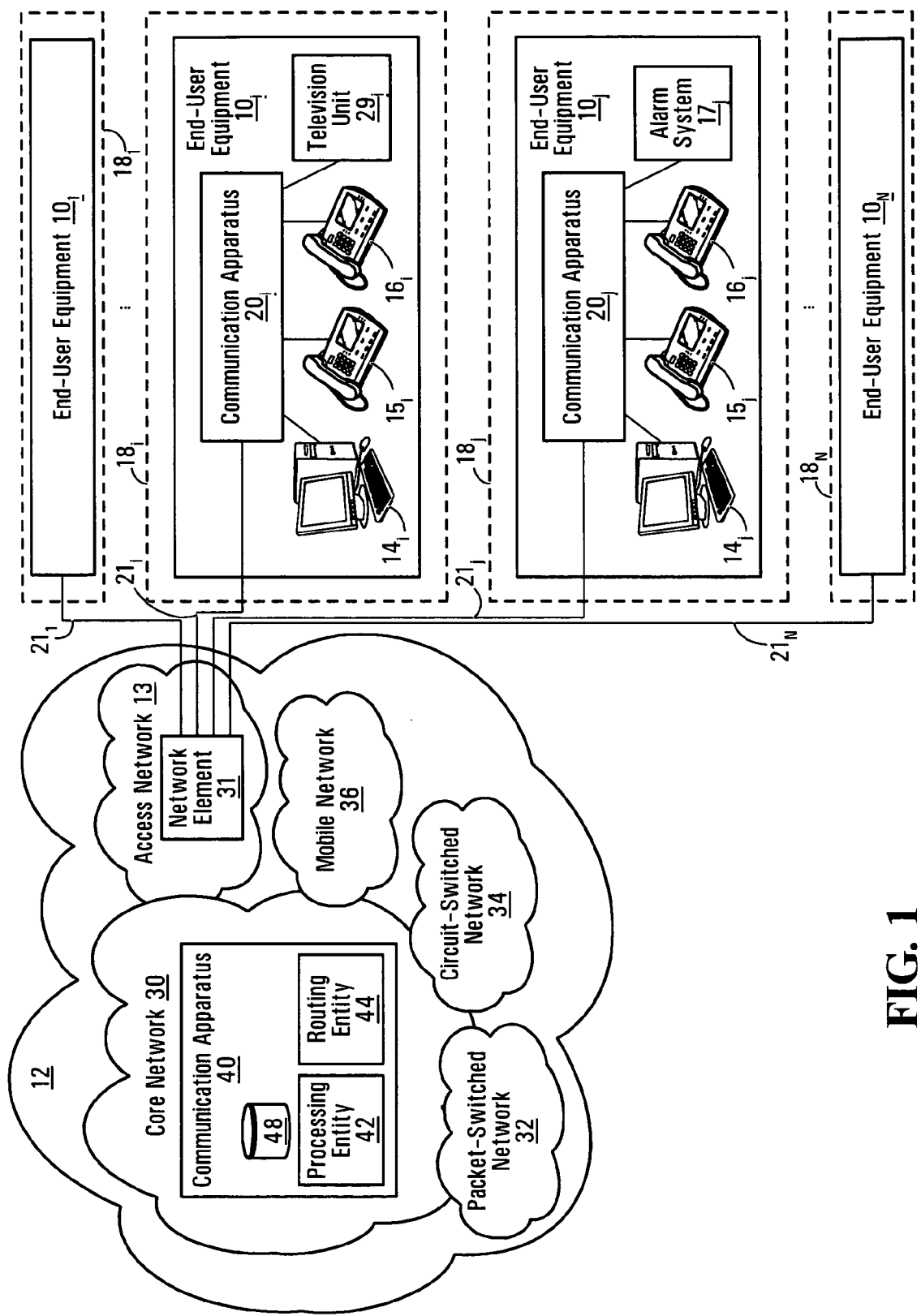
FIG. 1 shows an example of an architecture comprising a communications network allowing end-user equipment located at respective end-user premises to effect various communications, in accordance with an embodiment of the invention.

FIG. 1 shows an example of an architecture comprising a communications network 12 allowing end-user equipment $10_1$-$10_N$ located at respective end-user premises $18_1$-$18_N$ to effect various communications, including telephone calls, accesses to data network sites (e.g., websites), alarm system communications, and/or other communications (e.g., television signals, etc.), in accordance with an embodiment of the invention. Each of the end-user premises $18_1$-$18_N$ may be a residence (such as a house or an apartment) or other building (or a part thereof).

The end-user equipment $10_x$ ($1 \leq x \leq N$) at the end-user premise $18_x$ is connected to the communications network 12 via a respective one of a plurality of communication links $21_1$-$21_N$ that reach corresponding ones of the end-user premises $18_1$-$18_N$. In this embodiment, the communication links $21_1$-$21_N$ are part of an access network 13 that is provided by a service provider providing communication services to the end-user premises $18_1$-$18_N$. The access network 13 leads to a core network 30 provided by the service provider to enable the end-user equipment $10_1$-$10_N$ at the end-user premises $18_1$-$18_N$ to effect communications over various networks of the communications network 12, including a packet-switched network 32 (e.g., the Internet), a circuit-switched network 34 (e.g., the Public Switched Telephone Network (PSTN)) and a mobile network 36 (e.g., a Global System for Mobile Communications (GSM) network or other cellular network).

More particularly, in this embodiment, each of the communication links $21_1$-$21_N$ comprises a metallic twisted-pair cable (e.g., a copper twisted-pair cable) or a coaxial cable that is connected to a network element 31 of the access network 13. Also, in this embodiment, the access network 13 is based on a fiber-to-the-node or -neighborhood (FTTN) infrastructure such that the network element 31 comprises a FTTN platform (e.g., an Alcatel 7330 Intelligent Services Access Manager (ISAM) Fiber to the Node (FTTN) platform) which, in addition to being connected to the communication links $21_1$-$21_N$, is connected to optical fiber cabling of the access network 13. The optical fiber cabling is connected to other components of the access network 13 (e.g., one or more routers or switches, an optical Ethernet network, etc.) that interface with the core network 30.

The access network 13 and the communication links $21_1$-$21_N$ may be implemented in various other ways in other embodiments. For example, in some embodiments, the access network 13 may be based on a fiber-to-the-curb (FTTC) infrastructure and the network element 31 may be a FTTC platform. In other embodiments, the network element 31 may be omitted depending on the nature of the access network 13. For instance, in some embodiments, the access network 13 may be based on a fiber-to-the-premises (FTTP) infrastructure (e.g., fiber-to-the-building (FTTB) or fiber-to-the-house (FTTH) infrastructures) in which case the communication links $21_1$-$21_N$ may comprise optical fiber cables leading to optical network terminals (ONTs) that may be part of the end-user equipment $10_1$-$10_N$ at the end-user premises $18_1$-$18_N$. In yet other embodiments, the communication links $21_1$-$21_N$ may comprise a wireless link portion (e.g., a WiMAX link, a satellite-based link, etc.).

The core network 30 comprises a communication apparatus 40 configured to perform various operations when a communication, such as a telephone call or an access to a data network site, is originated by, destined for, in progress at certain end-user equipment (such as any of the end-user equipment $10_1$-$10_N$). The communication apparatus 40 comprises suitable hardware, firmware, software or a combination thereof for implementing a plurality of functional entities, including a processing entity 42, a routing entity 44 and a database 48.

The processing entity 42 implements a processing logic to process communications originated by, destined for, or in progress at end-user equipment (such as any of the end-user equipment $10_1$-$10_N$). The processing logic may be defined by a sequence of decisions to be taken with respect to a given communication, which may lead to one or more actions being performed based on those decisions. Each decision taken with respect to the given communication may be based on one or more factors. One example of such a factor is an origin of the given communication which, for instance, may be specified by: a telephone number, an Internet Protocol (IP) address, a Uniform Resource Identifier (URI) (e.g., a Session Initiation Protocol (SIP) URI), and/or another identifier identifying a device that originated the given communication; a name or other identifier of a party that originated the given communication; a time at which the given communication was originated (e.g., a day, hour, minute, etc.); and/or a location (e.g., a civic address) where the given communication was originated. Another example of such a factor is a destination of the given communication which, for instance, may be specified by: a telephone number, an IP address, a URI (e.g., a SIP URI), and/or another identifier identifying a device for which the given communication is destined; a name or other identifier of a party for which the given communication is destined; and/or a location (e.g., a civic address) for which the given communication is destined. In some cases, a factor on which may be based a decision to be taken with respect to the given communication may also be defined in terms of certain information included in the database 48 that may be accessed by the processing entity 42 (e.g., where the given communication is a telephone call, certain information in the database 48 on how to process calls involving a party having originated the telephone call or for which the telephone call is destined may be used by the processing entity 42).

Figure 2:
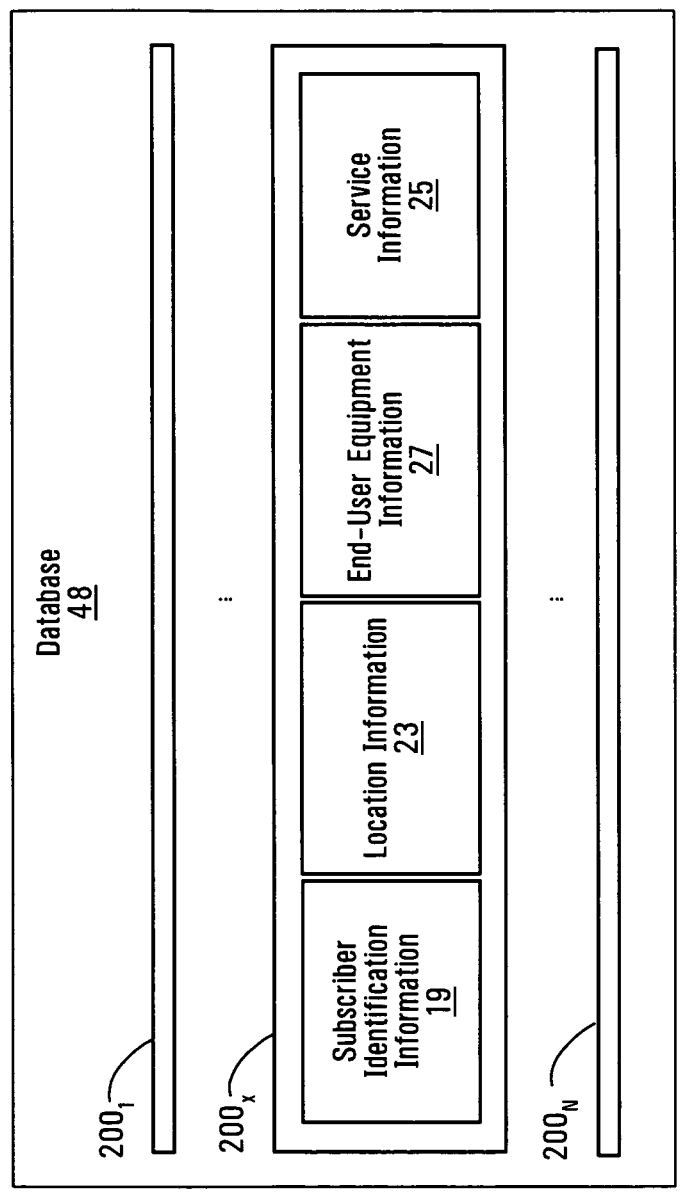
FIG. 2 shows an example of potential contents of a database of a communication apparatus of the communications network shown in FIG. 1.

FIG. 2 shows an example of potential contents of the database 48. In this example, the database 48 stores a plurality of records $200_1$-$200_N$, where each of these records is associated with a subscription to communication services provided by the service provider to a respective one of the end-user premises $18_1$-$18_N$. In other words, each of the end-user premises $18_1$-$18_N$ is associated with a different subscriber (i.e., a person or group of persons) to which the service provider provides communication services. The database 48 may store other records associated with other subscriptions associated with other end-user premises which are served by the service provider.

The record $200_x$ is associated with the subscriber to which communication services are provided at the end-user premise $18_x$ and includes various types of information. More particularly, in this example, the record $200_x$ includes:

subscriber identification information 19 identifying the subscriber. For example, the subscriber identification information 19 may include an account number (e.g., a phone number) and/or another subscriber identifier (e.g., a name);

location information 23 indicating a physical location of the end-user premise $18_x$. For example, the location information 23 may include a civic address, a set of geo-coordinates, and/or any other information that indicates the physical location of the end-user premise $18_x$;

end-user equipment information 27 regarding the end-user equipment $10_x$ at the end-user premises $18_x$, which includes information regarding each of one or more pieces of equipment of the end-user equipment $10_x$. For example, the information regarding a given piece of equipment of the end-user equipment $10_x$ may include an identifier of the given piece of equipment, such as: a Media Access Control (MAC) address, an Ethernet hardware address (EHA), or another hardware identifier of the given piece of equipment; an IP address assigned to the given piece of equipment; a URI (e.g., a SIP URI) identifying the given piece of equipment; or any other information that identifies the given piece of equipment. The end-user equipment information 27 may also include additional information that concerns the end-user equipment $10_x$ at the end-user premises $18_x$, examples of which will be discussed later on; and service information 25 regarding one or more communication services provided to the subscriber by the service provider. For example, the service information 25 may comprise call processing information that is related to processing of calls destined for or originated by the subscriber and that is used by the communication apparatus 40 to process such calls. In some cases, the call processing information may relate to one or more telephony features (e.g., call forwarding, call waiting, calling line identification (CLID) display, etc.) that may be subscribed to by the subscriber.

While this example illustrates certain information that can be included in the records $200_1$-$200_N$ of the database 48, various other information may be included in these records in other embodiments. In addition, while it is depicted in FIG. 1 as being one component, the database 48 may be distributed in nature. For example, in some embodiments, the database 48 can have portions of its content stored in different data storage media possibly located in different components of the communication apparatus 40 that are linked by one or more physical (i.e., wired or wireless) links.

The routing entity 44 is operative to cause one or more actions to be performed based on one or more decisions taken by the processing entity 42 with respect to a given communication, such as route information conveyed by the given communication to a certain piece of equipment which may be, for instance, a certain end-user device or a certain network element (e.g., a router). For example, the routing entity 44 may cause information conveyed by the given communication to be routed via the packet-switched network 32, the circuit-switched network 34, or the mobile network 36. To that end, the routing entity 44 may interact with one or more gateways interfacing with the packet-switched network 32, the circuit-switched network 34, and the mobile network 36

In some embodiments, the processing entity 42, the routing entity 44 and the database 48 may be implemented by a common network component. For example, in some embodiments, the processing entity 42, the routing entity 44 and the database 48 may be implemented by a softswitch or other computer platform. Alternatively, in other embodiments, the processing entity 42, the routing entity 44 and the database 48 may be implemented by two or more different network components that are linked by one or more physical (i.e., wired or wireless) links. For example, in some embodiments, the processing entity 42, the routing entity 44 and the database 48 may be implemented by two or more softswitches or other computer platforms.

The end-user equipment $10_x$ at the end-user premise $18_x$ comprises various pieces of equipment that can be used to effect communications, including telephone calls, accesses to data network sites, alarm system communications, and/or other communications (e.g., television signals). More particularly, the end-user equipment $10_x$ at the end-user premise $18_x$ comprises one or more end-user devices configured to effect communications, such as: one or more telephones, each of which may be, for instance, a wired Plain Old Telephony System (POTS) phone (including a cordless phone), a Voice-over-Internet Protocol (VoIP) phone, a POTS phone equipped with an analog terminal adapter (ATA), a softphone (i.e., a computer equipped with telephony software), or a telephony-enabled television unit (e.g., a set-top box connected to a television and a remote control); one or more computers, each of which may comprise, for instance, a desktop computer, a laptop computer or another personal computer (PC); one or more alarm system devices of an alarm system (sometimes also referred to as a "security system"), each of which may comprise, for instance, a door or window opening detector, a smoke detector, a motion detector, a glass break detector and/or another detector, a controller, and/or another piece of equipment of the alarm system; and/or one or more other end-user devices (e.g., a television unit).

Also, in this embodiment, the end-user equipment $10_x$ at the end-user premise $18_x$ comprises a communication apparatus $20_x$ that is connected to the one or more end-user devices at the end-user premise $18_x$ and to the communication link $21_x$ reaching the end-user premise $18_x$ in order to allow these one or more end-user devices to communicate over the communications network 12 via the communication link $21_x$. The communication apparatus $20_x$ at the end-user premise $18_x$ can thus be viewed as a communications center or hub through which communications originated by, destined for, or in progress at the one or more end-user devices at the end-user premise $18_x$ are effected via the communication link $21_x$ reaching the end-user premise $18_x$.

In some situations, an ability of the end-user equipment $10_x$ to communicate via the communication link $21_x$ can be disrupted (i.e., not normal). For example, in some cases, the communication link $21_x$ can be disrupted, for instance, due to a cut or other physical damage inflicted (accidentally or maliciously) to the communication link $21_x$ (e.g., to a metallic twisted-pair or coaxial cable thereof), a defective or inoperative port of the network element 31 to which the communication link $21_x$ is connected, or any other condition preventing the communication link $21_x$ from operating normally. In other cases, software and/or hardware (e.g., a modem) of the end-user equipment $10_x$ used by the end-user equipment $10_x$ to effect communications via the communication link $21_x$ can be disrupted, for instance, due to a defective or inoperative component. In such situations, it may no longer be possible for the end-user equipment $10_x$ to effect telephone calls, accesses to data network sites, alarm system communications, and/or other communications via the communication link $21_x$ reaching the end-user premise $18_x$. For certain communications, such as important or emergency phone calls (e.g., "911" calls) or alarm system communications potentially indicative of undesirable events (e.g., an intrusion or a fire at the end-user premise $18_x$), this difficulty or impossibility to communicate via the communication link $21_x$ may have negative, and in some cases, fatal consequences.

In accordance with an embodiment of the invention, and as further discussed below, when an ability of the end-user equipment $10_x$ to communicate via the communication link $21_x$ reaching the end-user premise $18_x$ is determined to be disrupted, the communication apparatus $20_x$ of the end-user equipment $10_x$ at the end-user premise $18_x$ can cause a wireless communication link to be established between the end-user equipment $10_x$ and the end-user equipment $10_y$ ($1 \leq y \leq N$; $y \neq x$) at the end-user premise $18_y$ in order to allow the end-user equipment $10_x$ to effect communications having certain destinations over the communications network 12 via this wireless communication link and the communication link $21_y$ reaching the end-user premise $18_y$. This provides a failover mechanism that enables the end-user equipment $10_x$ at the end-user premise $18_x$ to continue to be able to effect telephone calls, accesses to data network sites, alarm system communications, and/or other communications having certain destinations over the communications network 12 despite its ability to communicate via the communication link $21_x$ being disrupted. In other words, despite the ability of the end-user equipment $10_x$ to communicate via the communication link $21_x$ being disrupted, the end-user equipment $10_x$ at the end-user premise $18_x$ continues to be able to effect telephone calls, accesses to data network sites, alarm system communications, and/or other communications having certain destinations over the communications network 12 by "piggybacking" on the communication link $21_y$ reaching the end-user premise $18_y$.

Figure 3:
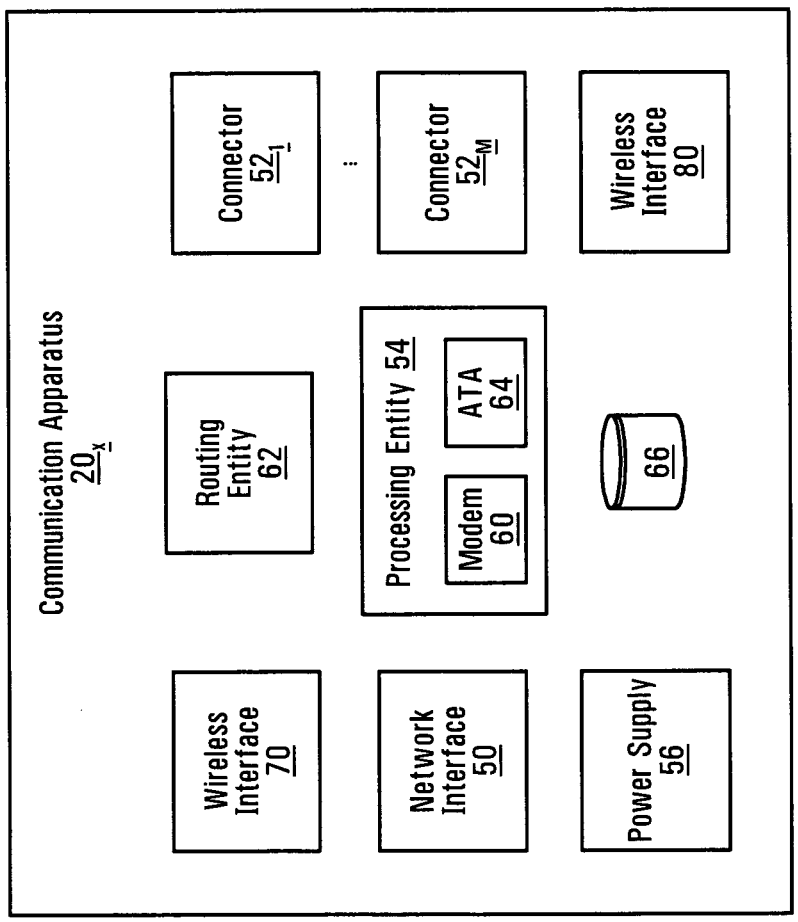
FIG. 3 shows a communication apparatus of the end-user equipment located at one of the end-user premises shown in FIG. 1.

With additional reference to FIG. 3, the communication apparatus $20_x$ of the end-user equipment $10_x$ at the end-user premise $18_x$ comprises suitable hardware, firmware, software or a combination thereof for implementing a plurality of functional entities, including, in this embodiment, a network interface 50, a plurality of connectors $52_1$-$52_M$, a wireless interface 80, a wireless interface 70, a processing entity 54, a routing entity 62, a database 66, and a power supply 56. In some embodiments, these entities of the communication apparatus $20_x$ may be integrated into a terminal installed at a suitable location (e.g., a basement or other location) at the end-user premise $18_x$. In other embodiments, these entities of the communication apparatus $20_x$ may be part of two or more devices interconnected to one another via one or more physical links.

The network interface 50 is connected to the communication link $21_x$ reaching the end-user premise $18_x$ in order to provide an interface between the end-user equipment $10_x$ and the communications network 12. For example, in some embodiments, the network interface 50 may be implemented by a network interface device (NID) and a channel service unit/data service unit (CSU/DSU). In other embodiments, the network interface 50 may be implemented in various other manners depending on the nature of the communication link $21_x$.

The connectors $52_1$-$52_M$ enable connection of one or more end-user devices of the end-user equipment $10_x$ to the communication apparatus $20_x$. For example, individual ones of the connectors $52_1$-$52_M$ may be an RJ11 connector (e.g., for connecting a wired POTS phone), an RJ45 connector (e.g., for connecting a computer or a VoIP phone) or any other type of connector (e.g., a connector for connecting to a television set-top box, a connector for connecting to an alarm system device, etc.).

The wireless interface 80 is configured to wirelessly exchange information with one or more end-user devices of the end-user equipment $10_x$ at that end-user premise $18_x$. More particularly, the wireless interface 80 comprises a wireless transmitter and a wireless receiver to wirelessly exchange information with one or more end-user devices of the end-user equipment $10_x$. For example, in some embodiments, the wireless interface 80 may be implemented by a wireless router based on WiFi (IEEE 802.11) technology or other wireless communication technologies.

The wireless interface 70 is configured to establish a wireless communication link between the end-user equipment $10_x$ at the end-user premise $18_x$ and the end-user equipment $10_y$ at the end-user premise $18_y$, when the ability of the end-user equipment $10_x$ to communicate via the communication link $21_x$ reaching the end-user premise $18_x$ is determined to be disrupted. More particularly, the wireless interface 70 comprises a wireless transmitter and a wireless receiver to wirelessly exchange information with the end-user equipment $10_y$ at the end-user premise $18_y$. For example, in some embodiments, the wireless interface 70 may be based on WiFi technology or other wireless communication technologies.

The processing entity 54 is configured to receive requests for communications originated by the one or more end-user devices of the end-user equipment $10_x$. For example, the processing entity 54 may receive a request for a telephone call originated by a telephone of the end-user equipment $10_x$, a request for an access to a data network site originated by a computer of the end-user equipment $10_x$, a request for an alarm system communication originated by an alarm system device, and/or a request for another type of communication originated by another end-user device of the end-user equipment $10_x$.

The processing entity 54 is also configured to process information pertaining to communications effected by the end-user equipment $10_x$. More particularly, in this embodiment, the processing entity 54 comprises a modem 60 and an analog telephony adapter (ATA) 64. The modem 60 is configured to modulate an analog carrier signal to encode digital information for transmission via the network interface 50 and to demodulate an analog carrier signal received via the network interface 50 to decode information it conveys. For example, in some embodiments, the modem 60 may be a digital subscriber line (DSL) modem or a cable modem, depending on the nature of the communication link $21_x$. The ATA 64 is configured to convert analog telephony signals from any wired POTS phone that may be part of the end-user equipment $10_x$ and connected to one of the connectors $52_1$-$52_M$ into digital information to be processed by the routing entity 62 and the modem 60, and vice versa.

The processing entity 54 is also configured to determine whether the ability of the end-user equipment $10_x$ to communicate via the communication link $21_x$ is disrupted. For example, in this embodiment, the processing entity 54 may monitor the network interface 50 to detect a disruption of the communication link $21_x$ (e.g., detect that no signal is received or transmittable by the network interface 50 via the communication link $21_x$ or detect that a signal received via the communication link $21_x$ at the network interface 50 fails to meet certain quality-of-service criteria). The processing entity 54 may also monitor software and/or hardware of the communication apparatus $20_x$ to detect a defective or inoperative component (e.g., detect that the modem 60 is not operating normally). In other embodiments, the processing entity 54 may determine that the ability of the end-user equipment $10_x$ to communicate via the communication link $21_x$ is disrupted in various other ways, such as based on information received from a source external to the communication apparatus $20_x$ and indicative of a disruption of the ability of the end-user equipment $10_x$ to communicate via the communication link $21_x$ (e.g., the communication apparatus 40 in the core network 30 may determine that the communication link $21_x$ is disrupted and cause the end-user equipment $10_y$ at the end-user premise $18_3$, to transmit information received via the wireless interface 70 of the communication apparatus $20_x$ at the end-user premise $18_x$ and indicative of a disruption of the communication link $21_x$).

In some situations, the processing entity 54 may receive a request for a communication originated by an end-user device of the end-user equipment $10_x$ when the ability of the end-user equipment $10_x$ to communicate via the communication link $21_x$ is disrupted. In such situations, the processing entity 54 is configured to determine, based on a destination of the communication, whether the communication is to be effected over the communications network 12, despite the ability of the end-user equipment $10_x$ to communicate via the communication link $21_x$ being disrupted. In other words, the destination of the communication may indicate a degree of importance of the communication and may thus be used by the processing entity 54 to assess whether the communication should be effected over the communications network 12, despite the ability of the end-user equipment $10_x$ to communicate via the communication link $21_x$ being disrupted. For example, if the communication is an emergency call placed to a emergency phone number (e.g., a "911" call), the emergency call should be effected over the communications network 12, despite the ability of the end-user equipment $10_x$ to communicate via the communication link $21_x$ being disrupted, in view of potential serious or fatal consequences that can arise. The processing entity 54 may determine whether the communication is to be effected over the communications network 12 based on the destination of the communication in various ways, as discussed later on.

The routing entity 62 is configured to cause information transmitted by or destined for the end-user equipment $10_x$ to be exchanged over the communications network 12. More particularly, in this embodiment, when the ability of the end-user equipment $10_x$ to communicate via the communication link $21_x$ is normal (i.e., is not disrupted), the routing entity 62 routes information received via the connectors $52_1$-$52_M$ and/or the wireless interface 80 towards the modem 60 for transmission via the network interface 50 and routes information received from the modem 60 towards the connectors $52_1$-$52_M$ and/or the wireless interface 80 for transmission to one or more end-user devices of the end-user equipment $10_x$. However, when the ability of the end-user equipment $10_x$ to communicate via the communication link $21_x$ is determined to be disrupted (i.e., not normal), and in a situation where the processing entity 54 determines that a communication originated by an end-user device of the end-user equipment $10_x$ is to be effected in view of its destination, the routing entity 62 can cause the wireless interface 70 to establish a wireless communication link with the end-user equipment $10_y$ at the end-user premise $18_y$. The routing entity 62 can proceed to route information pertaining to the communication and received via one of the connectors $52_1$-$52_M$ and/or the wireless interface 80 towards the wireless interface 70 such that it is conveyed via the established wireless communication link. The routing entity 62 may also route information pertaining to the communication, conveyed via the established wireless communication link and received via the wireless interface 70 towards the connectors $52_1$-$52_M$ and/or the wireless interface 80 for transmission to one or more end-user devices of the end-user equipment $10_x$.

Figure 4:
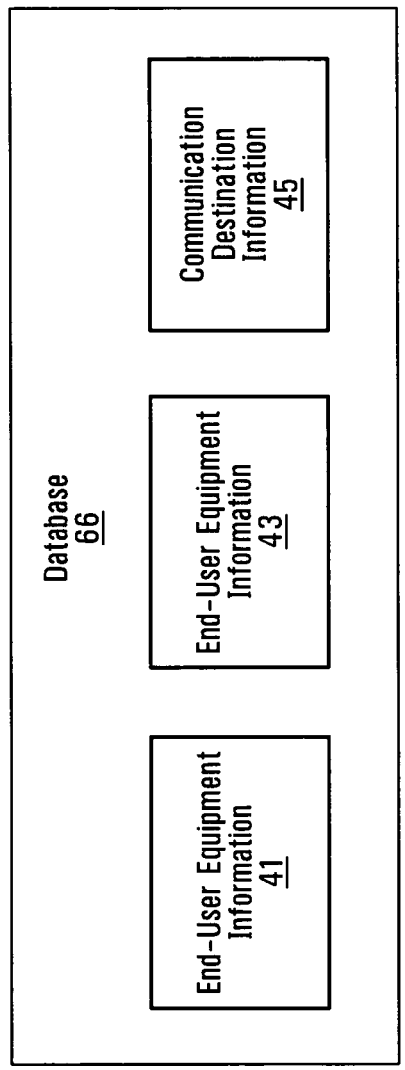
FIG. 4 shows an example of potential contents of a database of the communication apparatus shown in FIG. 3.

The database 66 stores information that can be used by the communication apparatus $20_x$ in operation. FIG. 4 shows an example of potential contents of the database 66.

In this example, the database 66 stores end-user equipment information 41 regarding the end-user equipment $10_x$, which includes information regarding each of one or more pieces of equipment of the end-user equipment $10_x$ (e.g., the communication apparatus $20_x$ and the one or more end-user devices at the end-user premise $18_x$). More particularly, in this example, the information regarding a given piece of equipment of the end-user equipment $10_x$ may include:

an identifier of the given piece of equipment, such as a MAC address, EHA, or other hardware identifier of that piece of equipment, an IP address assigned to that piece of equipment, a URI (e.g., a SIP URI) identifying that piece of equipment, or any other information that identifies that piece of equipment; and depending on the nature of the given piece of equipment, access information to be provided to the given piece of equipment in order to access (i.e., make use of) that piece of equipment. For example, the access information for the given piece of equipment may comprise a code, such as a password or a wireless network key (e.g., a Wi-Fi Protected Access (WPA) key).

In addition, in this example, the database 66 stores end-user equipment information 43 regarding end-user equipment at one or more other ones of the end-user premises $18_1$-$18_N$ that is within wireless range of the end-user equipment $10_x$ at the end-user premise $18_x$. For example, if the end-user equipment $10_z$ ($1 \leq z \leq N$; $z \neq x$) at the end-user premise $18_z$ is within wireless range of the end-user equipment $10_x$ at the end-user premise $18_x$, the end-user equipment information 43 may include information regarding each of one or more pieces of equipment of the end-user equipment $10_z$ (e.g., the communication apparatus $20_z$ and the one or more end-user devices at the end-user premise $18_z$). For instance, the information regarding a given piece of equipment of the end-user equipment $10_z$ may include: an identifier of the given piece of equipment such as a MAC address, EHA, or other hardware identifier of that piece of equipment, an IP address assigned to that piece of equipment, a URI (e.g., a SIP URI) identifying that piece of equipment, or any other information that identifies that piece of equipment; and, depending on the nature of the given piece of equipment, access information to be provided to the given piece of equipment in order to make use of that piece of equipment (e.g., a password or a wireless network key).

The end-user equipment information 41 regarding the end-user equipment $10_x$ may be provided in the database 66 in various ways. For example, in some cases, the identifier of and/or access information for any piece of equipment of the end-user equipment $10_x$ may be provided in the database 66 by a user at the end-user premise $18_x$ when setting up that piece of equipment. In other cases, the identifier of and/or access information for any piece of equipment of the end-user equipment $10_x$ may be provided in the database 66 by the service provider, for example, by the communication apparatus 40 transmitting this information via the communication link $21_x$.

Similarly, the end-user equipment information 43 regarding end-user equipment at one or more other ones of the end-user premises $18_1$-$18_N$ that is within wireless range of the end-user equipment $10_x$ at the end-user premise $18_x$ may be provided in the database 66 in various ways. For example, in some cases, the end-user equipment information 43 may be provided in the database 66 by the service provider, for example, by the communication apparatus 40 transmitting this information via the communication link $21_x$. In other cases, the end-user equipment information 43 may be provided in the database 66 during a provisioning phase (e.g., when the communication apparatus $20_x$ is initially set up at the end-user premise $18_x$) using an exchange of information between the communication apparatus $20_x$ at the end-user premise $18_x$ and the communication apparatus at each of these one or more other ones of the end-user premises $18_1$-$18_N$ that is within wireless range of the end-user equipment $10_x$ at the end-user premise $18_x$.

Furthermore, in this example, the database 66 stores communication destination information 45 regarding one or more destinations of communications that are to be effected over the communications network 12 if requested when the ability of the end-user equipment $10_x$ to communicate via the communication link $21_x$ is disrupted. As mentioned previously, the destination of a given communication may be specified, for instance, by: a telephone number, an IP address, a URI (e.g., a SIP URI), a MAC address, EHA or other hardware identifier, and/or another identifier identifying a device for which the given communication is destined; a name or other identifier of a party for which the given communication is destined; and/or a location (e.g., a civic address) for which the given communication is destined. The communication destination information 45 can thus be viewed as indicating which communications are important enough to be effected over the communications network 12 despite the ability of the end-user equipment $10_x$ to communicate via the communication link $21_x$ being disrupted in some situations.

For example, in some embodiments, the communication destination information 45 may comprise: a telephone number, an IP address, a URI (e.g., a SIP URI), a MAC address, EHA or other hardware identifier, and/or another identifier identifying a device associated with an emergency or other public-safety service available in an area where the end-user premises $18_1$-$18_N$ are located (e.g., the "911" phone number, the phone number of a local public-safety agency such as a local police station or fire station, etc.); a telephone number, an IP address, a URI (e.g., a SIP URI), a MAC address, EHA or other hardware identifier, and/or another identifier identifying a device associated with a healthcare service (e.g., the phone number of a local healthcare institution such as a local hospital or clinic, the phone number of a poison control center, etc.); and/or a telephone number, an IP address, a URI (e.g., a SIP URI), a MAC address, EHA or other hardware identifier, and/or another identifier which, when specifying the destination of a particular communication, indicates that the particular communication is sufficiently important to be effected over the communications network 12 if requested when the ability of the end-user equipment $10_x$ to communicate via the communication link $21_x$ is disrupted. In other embodiments, the communication destination information 45 may comprise other information regarding the one or more destinations of communications that are to be effected over the communications network 12 if requested when the ability of the end-user equipment $10_x$ to communicate via the communication link $21_x$ is disrupted.

The communication destination information 45 may be provided in the database 66 in various ways. For example, in some cases, part or all of the communication destination information 45 may be provided in the database 66 by a user at the end-user premise $18_x$ when setting up the communication apparatus $20_x$. In other cases, part or all of the communication destination information 45 may be provided in the database 66 by the service provider, for example, by the communication apparatus 40 transmitting this information via the communication link $21_x$.

While this example illustrates certain information that can be included in the database 66, other information may be included in that database in other embodiments. Also, while it is depicted in FIG. 3 as being one component, the database 66 may be distributed in nature. For example, in some embodiments, the database 66 can have portions of its content stored in different data storage media of the communication apparatus $20_x$.

The power supply 56 is configured to power the communication apparatus $20_x$ using electrical power from an electrical network of the end-user premise $18_x$. In addition, the power supply 56 is capable of powering the communication apparatus $20_x$ in cases where the electrical network of the end-user premise $18_x$ does not provide sufficient electrical power (including no electrical power at all) for operation of the communication apparatus $20_x$ (e.g., due to a power outage or a malfunction in the electrical network). For example, the power supply 56 may comprise one or more batteries capable of powering the communication apparatus $20_x$ for a prolonged period of time (e.g., several hours or a few days) before being depleted. The power supply 56 may also comprise charging circuitry for recharging the one or more batteries using electrical power from the electrical network of the end-user premise $18_x$.

While they are shown as distinct entities, different ones of the functional entities of the communication apparatus $20_x$ may be implemented by a common device. For example, the wireless interface 70 and the wireless interface 80 may be implemented by a common wireless router (e.g., a WiFi router). As another example, one or more of the connectors $52_1$-$52_M$ and the ATA 64 may be implemented by a common ATA device. As yet another example, the modem 60 and the network interface 50 may be implemented by a common network interface device. As yet another example, the processing entity 54 and the routing entity 62 may be implemented by a common processing platform. As yet another example, the wireless interface 70, the wireless interface 80, the processing entity 54 and the routing entity 62 may be implemented by a common routing device.

Also, while the communication apparatus $20_x$ is configured in a particular manner in this embodiment, the communication apparatus $20_x$ may be configured in various manners in other embodiments. For example, in some embodiments, the ATA 64 may be omitted in cases where the end-user equipment $10_x$ at the end-user premise $18_x$ does not comprise any POTS phone.

Figure 5A:
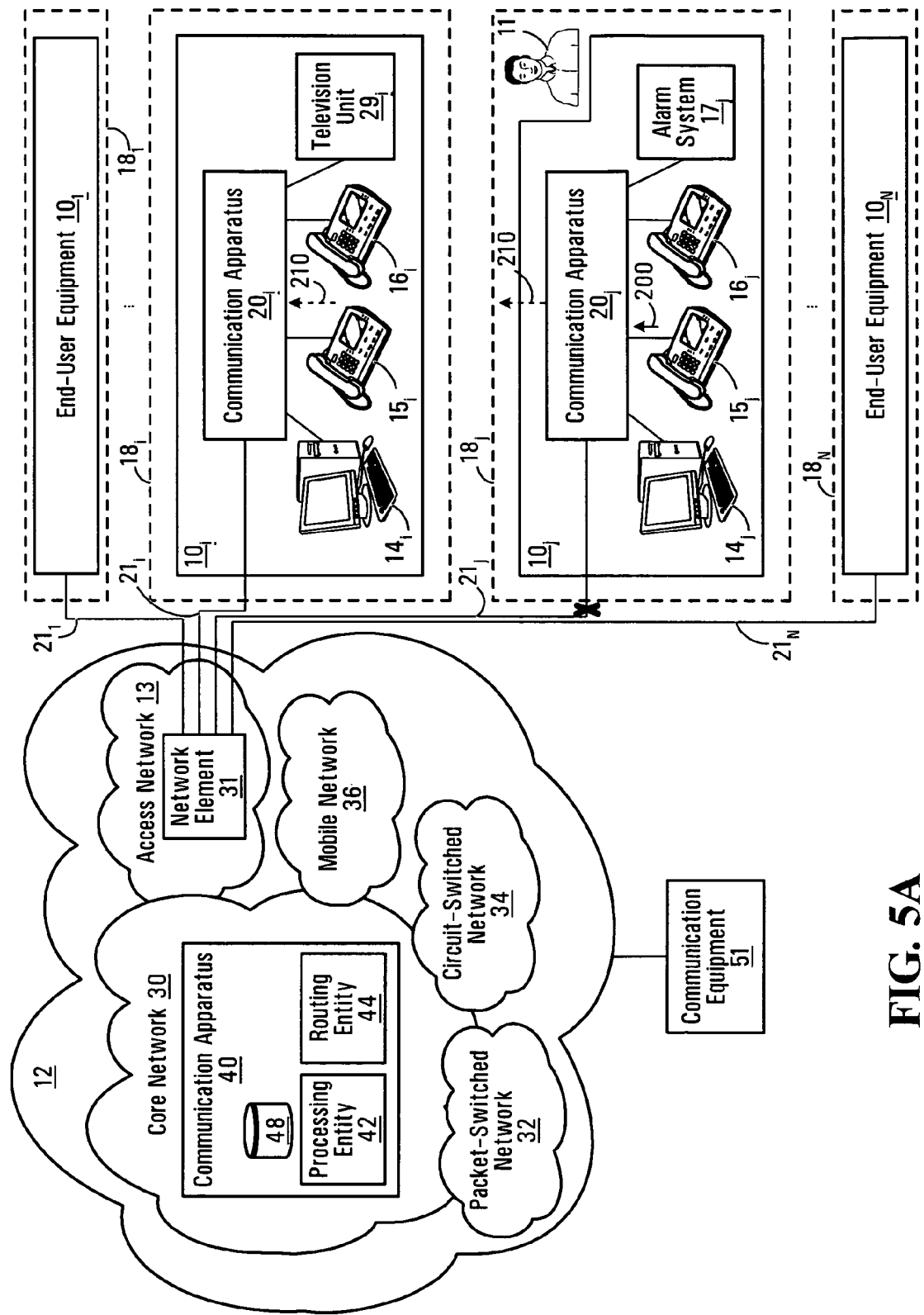
FIGS. 5A and 5B show an example in which a wireless communication link is established between the end-user equipment at a first one of the end-user premises and the end-user equipment at a second one of the end-user premises in order to allow information pertaining to a communication effected using the end-user equipment at the first one of the end-user premises to be exchanged over the communications network, when an ability of the end-user equipment at the first one of the end-user premises to communicate via a communication link connecting the end-user equipment at the first one of the end-user premises to the communications network is disrupted.
Figure 5B:
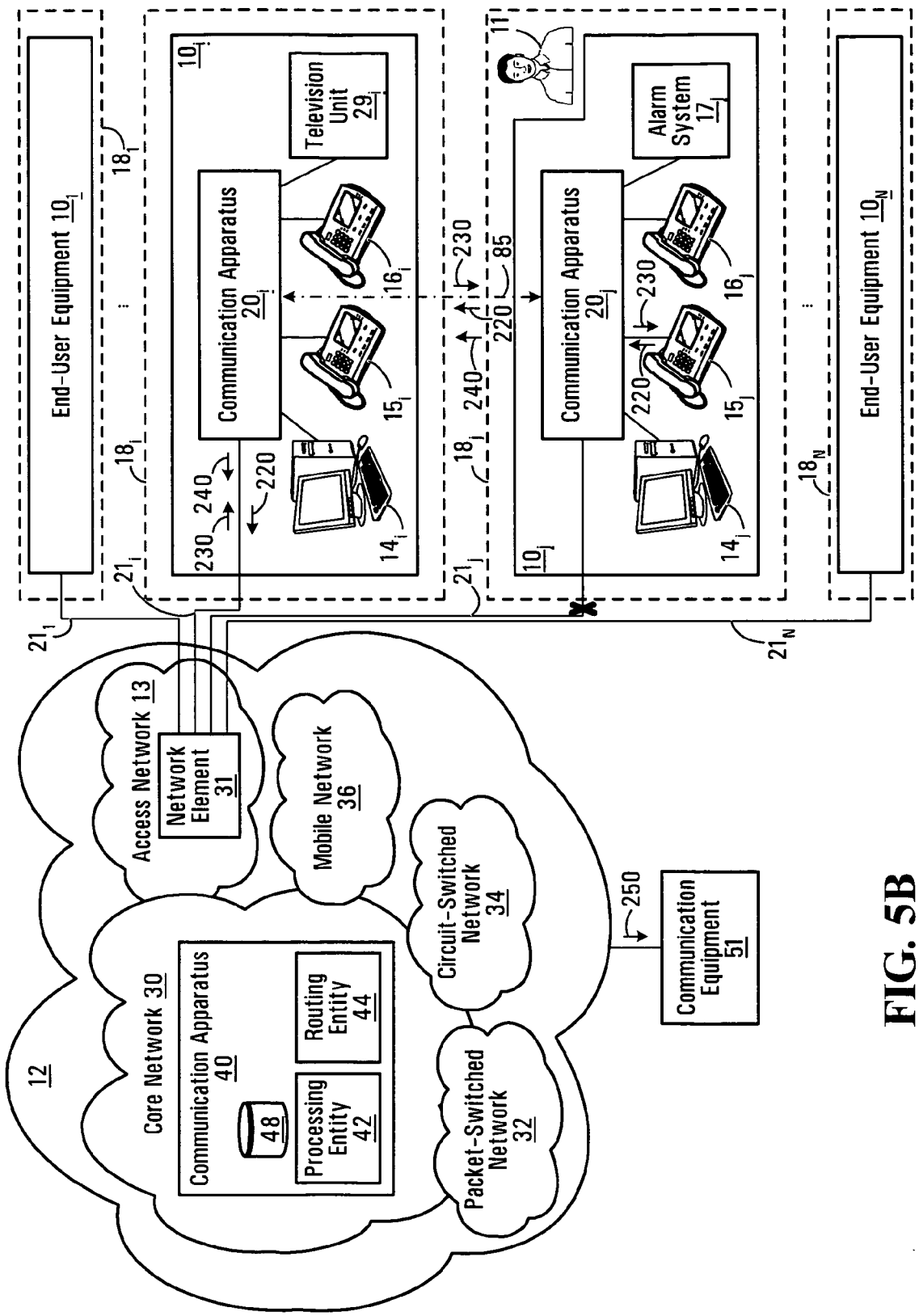

Turning to FIGS. 5A and 5B, an example illustrating how the end-user equipment $10_j$ at the end-user premise $18_j$ continues to be able to effect telephone calls, accesses to data network sites, alarm system communications, and/or other communications having certain destinations over the communications network 12 when its ability to communicate via the communication link $21_j$ is disrupted, will now be considered.

In this example, the end-user equipment $10_j$ comprises, in addition to the communication apparatus $20_j$, a plurality of end-user devices, including a computer $14_j$, a VoIP phone $15_j$, a POTS phone $16_j$, and alarm system devices (e.g., detectors, a controller) of an alarm system $17_j$, which are connected to the communication apparatus $20_j$ via its connectors $52_1$-$52_M$ and/or its wireless interface 80.

At one point in time, a telephone call, an access to a data network site, an alarm system communication, and/or another communication is to be effected by the end-user equipment $10_j$. The communication is destined for communication equipment 51, which, depending on the nature of the communication, may comprise a telephone, a computer and/or another communication device. More particularly, for purposes of this example, it is assumed that a user 11 at the end-user premise $18_j$ initiates a telephone call using the VoIP phone $15_j$. It is further assumed that the communication equipment 51 comprises a telephone for which the telephone call is destined.

As shown in FIG. 5A, the communication apparatus $20_j$ receives information 200 from the VoIP phone $15_j$ when the user 11 uses this phone to initiate the telephone call. The information 200 conveys a request for the telephone call being made using the VoIP phone $15_j$ and comprises information indicative of a destination of the telephone call. For example, the information 200 may include a phone number, an IP address, SIP data and/or other information that identifies the telephone of the communication equipment 51 for which the telephone call is destined The processing entity 54 of the communication apparatus $20_j$ verifies the ability of the end-user equipment $10_j$ to communicate via the communication link $21_j$ to assess whether it is normal or disrupted (i.e., not normal). This verification may be performed in various manners.

For example, in this embodiment, the processing entity 54 of the communication apparatus $20_j$ verifies a state of the communication link $21_j$ to assess whether it is operating normally or is disrupted (i.e., not operating normally). The state of the communication link $21_j$ may be verified in various ways. For instance, in this embodiment, the state of the communication link $21_j$ may be verified using an exchange of signals along the communication link $21_j$ between the communication apparatus $20_j$ and one or more components of the communications network 12, such as the network element 31 of the access network 13 or the core network 30. The communication apparatus $20_j$ may repeatedly (e.g., periodically) transmit signals along the communication link $21_j$ to one or more components of the communications network 12 and expect receipt of a given acknowledgement signal from the communications network 12.

Such an exchange of signals can allow the communication apparatus $20_j$ to verify the state of the communication link $21_j$ using criteria that determine whether the communication link $21_j$ is operating normally or is disrupted. In some cases, the criteria may include one or more of the following factors: timeliness (e.g., signals have to be received and/or acknowledged within a particular timeframe); acknowledgement (e.g., a signal received by a component has to be acknowledged by the receiving component with a return signal); quality-of-service (e.g., the receiving component assesses a quality of the received signals to ensure that it conforms with a particular quality of service level). In other cases, the criteria may include other factors.

The state of the communication link $21_j$ may thus be assessed by determining whether the signals exchanged between the communication apparatus $20_j$ and the communications network 12 via this link satisfy the criteria. For example, the state of the communication link $21_j$ may be deemed to be normal if the following criteria are met: the exchange of signals is completed within the expected timeframe (e.g., five (5) seconds); a component having transmitted a signal receives a return signal acknowledging the receipt of the transmitted signal; and/or the exchange of signals is completed within the expected quality-of-service level. In contrast, the state of the communication link $21_j$ may be deemed to be disrupted based on an exchange where signals are late or missing, signals are unacknowledged by one or more components, and/or the quality of signals exchanged falls below the expected quality of service.

While in this embodiment the processing entity 54 of the communication apparatus $20_j$ verifies the state of the communication link $21_j$ based on an exchange of signals along the communication link $21_j$ between the communication apparatus $20_j$ and one or more components of the communications network 12, the processing entity 54 may assess the state of the communication link $21_j$ in various other ways in other embodiments. For example, in some embodiments, the processing entity 54 may determine that the communication link $21_j$ is disrupted based on information received from a source external to the communication apparatus $20_j$ and indicative of a disruption of the communication link $21_j$ (e.g., the communication apparatus 40 in the core network 30 may determine that the communication link $21_j$ is disrupted and cause the end-user equipment $10_i$ at the end-user premise $18_i$ to transmit information received via the wireless interface 70 of the communication apparatus $20_j$ and indicative of a disruption of the communication link $21_j$).

Also, in this embodiment, in addition to verifying the state of the communication link $21_j$, the processing entity 54 of the communication apparatus $20_j$ verifies a state of one or more software and/or hardware components (e.g., the modem 60, the network interface 50) of the end-user equipment $10_j$ that are used to effect communications via the communication link $21_j$ in order to assess whether they are operating normally or are disrupted (i.e., not operating normally). For example, the processing entity 54 may verify the state of the modem 60 to assess whether it is operating normally or not (e.g., by verifying whether the modem 60 has issued any error code indicative of a malfunction).

For purposes of this example, assume that the ability of the end-user equipment $10_j$ to communicate via the communication link $21_j$ is disrupted. Specifically, in this example, assume that the communication link $21_j$ is disrupted, for instance, due to a cut or other physical damage inflicted to it, and thus cannot be used to reliably exchange information between the end-user equipment $10_j$ and the communications network 12.

The processing entity 54 of the communication apparatus $20_j$ proceeds to determine whether the telephone call is to be effected over the communications network 12 despite the ability of the end-user equipment $10_j$ to communicate via the communication link $21_j$ being disrupted. More particularly, the processing entity 54 determines, based on the destination of the telephone call, whether the telephone call is to be effected over the communications network 12, despite the ability of the end-user equipment to communicate via the communication link $21_j$ being disrupted.

To that end, in this embodiment, the processing entity 54 of the communication apparatus $20_j$ accesses the database 66 of the communication apparatus $20_j$ to consult the communication destination information 45. In this example, it is assumed that the communication destination information 45 in the database 66 of the communication apparatus $20_j$ includes: the emergency telephone number "911"; the telephone number, say "(555) 555-1234", of a local police station; the telephone number, say "(555) 555-6576", of a local fire station; the telephone number, say "(555) 555-5678", of a local hospital; and the telephone number, say "(555) 555-8894", of a poison control center.

The processing entity 54 of the communication apparatus $20_j$ determines whether the destination of the telephone call specified by the information 200 corresponds to any destination specified by the communication destination information 45 in the database 66. If not, the processing entity 54 performs no further action directed to effecting the telephone call. The processing entity 54 may perform some action to indicate to the user 11 that the telephone call cannot be effected since the communication link $21_j$ is disrupted (e.g., send information back to the VoIP phone $15_j$ indicating that the telephone call cannot be effected since the communication link $21_j$ is disrupted).

For purposes of this example, assume that the telephone call initiated by the user 11 is an emergency phone call and that the destination of the emergency phone call is specified in the information 200 by the telephone number "911" called using the VoIP phone $15_j$. Further assume that the communication equipment 51 for which the emergency phone call is destined is associated with a public-safety answering point (PSAP) or other emergency phone call answering point responsible for answering emergency phone calls placed from an area where the end-user premises $18_1$-$18_N$ are located. The processing entity 54 thus determines that telephone number being called and specified by the information 200 corresponds to the emergency telephone number "911" specified by the communication destination information 45 in the database 66. Accordingly, the processing entity 54 determines that the emergency phone call is to be effected over the communications network 12 despite the communication link $21_j$ being disrupted.

Thus, the processing entity 54 of the communication apparatus $20_j$ attempts to find another way to effect the emergency phone call over the communications network 12. More particularly, the communication apparatus $20_j$ attempts to implement a failover mechanism in which it attempts to establish a wireless communication link allowing it to effect the emergency phone call by routing the call to the communications network 12 via this wireless communication link and another one of the communications links $21_1$-$21_N$.

The processing entity 54 of the communication apparatus $20_j$ accesses the database 66 of the communication apparatus $20_j$ to obtain the end-user equipment information 43 regarding end-user equipment at one or more other ones of the end-user premises $18_1$-$18_N$ that is within wireless range of the end-user equipment $10_j$ at the end-user premise $18_j$.

In this example, it is assumed that the end-user equipment information 43 in the database 66 of the communication apparatus $20_j$ includes end-user equipment information regarding the end-user equipment $10_i$ at the end-user premise $18_i$, which is within wireless range of the end-user equipment $10_j$ at the end-user premise $18_j$. The end-user equipment $10_i$ comprises, in addition to the communication apparatus $20_i$, a plurality of end-user devices, including a computer $14_i$, a VoIP phone $15_i$, another VoIP phone $16_i$, and a television unit $29_i$, which are connected to the communication apparatus $20_i$ via its connectors $52_1$-$52_M$ and/or its wireless interface 80. It is also assumed in this example that the end-user equipment information 43 included in the database 66 of the communication apparatus $20_j$ at the end-user premise $20_i$ includes an identifier of the communication apparatus 20; (e.g., a MAC address, EHA, or other hardware identifier of the communication apparatus $20_i$, an IP address assigned to communication apparatus $20_i$, a URI (e.g., a SIP URI), or any other information that identifies the communication apparatus $20_i$) and access information to be provided to the communication apparatus $20_i$ in order to make use of the communication apparatus $20_i$ (e.g., a password or a wireless network key).

While in this example the end-user equipment information 43 in the database 66 pertains only to the end-user equipment $10_i$ at the end-user premise $18_i$, in other examples, the end-user equipment information 43 in the database 66 may include identifiers and access information for end-user equipment at other ones of the end-user premises $18_1$-$18_N$. In such a case, the processing entity 54 of communication apparatus $20_j$ may use a selection process to select one or more of the communication apparatuses $20_1$-$20_N$ listed in the database 66 with which it may attempt to establish a wireless communication link. For example, the selection process may define one or more "preferred" ones of the communication apparatuses $20_1$-$20_N$ listed in the database 66 that are predetermined by one or more components of the communications network 12, such as the communication apparatus 40 of the core network 30. As another example, the selection process may allow the processing entity 54 of the communication apparatus $20_j$ to decide with which of the other ones of the communication apparatuses $20_1$-$20_N$ listed in the database 66 it should attempt to establish a wireless communication link. For instance, the processing entity 54 may evaluate the other ones of the communication apparatuses $20_1$-$20_N$ listed in the database 66 based on criteria such as their physical proximity, wireless signal strength and/or reported network traffic load, and/or other factors. This may allow the communication apparatus $20_j$ to choose to establish a wireless communications link with a different one of the communication apparatuses $20_1$-$20_N$ listed in the database 66 every time the failover mechanism is initiated based on an evaluation of current signal strength and network traffic load.

Upon retrieving the identifier and access information of the communication apparatus $20_i$, the processing entity 54 of the communication apparatus $20_j$ causes the routing entity 62 of the communication apparatus $20_j$ to attempt to establish a wireless communication link between the communication apparatus $20_j$ and the communication apparatus $20_i$. More particularly, the processing entity 54 causes the routing entity 62 to wirelessly transmit information 210 to the communication apparatus $20_i$ via the wireless interface 70 of the communication apparatus $20_i$. The information 210 can be viewed as a request to access the communication apparatus $20_i$. In this example, the information 210 includes the identifier and access information of the communication apparatus $20_j$, as well as the identifier and access information of the communication apparatus $20_j$, which the processing entity 54 retrieved from the end-user equipment information 41 included in the database 66 of the communication apparatus $20_j$.

When it receives the information 210, the communication apparatus $20_i$ attempts to validate the identifier and access information of the communication apparatus $20_i$ that are included in the information 210. More particularly, the processing entity 54 of the communication apparatus $20_i$ verifies whether the identifier and access information of the communication apparatus $20_i$ that are included in the information 210 correspond to the identifier and access information of the communication apparatus $20_i$ that are included in the end-user equipment information 41 in the database 66 of the communication apparatus $20_i$. If not, the communication apparatus $20_i$ may deny the request of the communication apparatus $20_j$ to access the communication apparatus $2_i$ and may take some other action. For instance, the communication apparatus $20_i$ may send information back to the communication apparatus $20_j$ indicating that access to the communication apparatus $20_i$ is denied, and/or may send information to the communication apparatus 40 of the core network 30 to indicate that a failed connection attempt has occurred due to invalid credentials.

In this example, it is assumed that the identifier and access information of the communication apparatus $20_i$ that are included in the information 210 indeed correspond to the identifier and access information of the communication apparatus $20_i$ that are included in the end-user equipment information 41 in the database 66 of the communication apparatus $20_i$. Therefore, as shown in FIG. 5B, the communication apparatus $20_i$ grants access to the communication apparatus $20_j$, resulting in establishment of a wireless communications link 85 between the communication apparatus $20_j$ and the communication apparatus $20_i$.

With the wireless communication link 85 being established, the communication apparatus $20_j$ may proceed to effect the emergency phone call requested by the user 11 using the VoIP phone $15_j$ over the communications network 12 despite the disruption of the communications link $21_j$.

More particularly, the routing entity 62 of the communication apparatus $20_j$ transmits information 240 pertaining to the emergency phone call to the communications network 12 via the wireless communications link 85, the communication apparatus $20_i$ and the communication link $21_i$. In this example, the information 240 includes the emergency telephone number "911" called using the VoIP phone $15_j$. Also, in this example, the information 240 includes the identifier of the VoIP phone $15_j$ and the identifier of the communication apparatus $20_j$. The information 240 may also include other call control information that may be needed to establish the emergency phone call.

The communication apparatus 40 of the core network 30 receives the information 240. The processing entity 42 of the communication apparatus 40 determines, based on the emergency telephone number "911" included in the information 240, that the emergency phone call is destined for the communication equipment 51 associated with the PSAP. The processing entity 42 accesses the database 48 to search for a given one of the records $200_1$-$200_N$ in which the end-user equipment information 27 includes an identifier corresponding to the identifier of the VoIP phone $15_j$ and/or an identifier corresponding to the identifier of the communication apparatus $20_j$ included in the information 240. In this example, the processing entity 42 finds the record $200_j$, which is associated with the subscriber to which the service provider provides communication services to the end-user premise $18_j$ and in which the end-user equipment information 27 includes the identifier of the VoIP phone $15_j$ and/or the identifier of the communication apparatus $20_j$.

Upon finding the record $200_j$, the processing entity 42 retrieves the location information 23 included in the record $200_j$ and indicative of the physical location of the end-user premise $18_j$ (e.g., a civic address and/or a set of geo-coordinates). The processing entity 42 proceeds to cause the routing entity 44 of the communication apparatus 40 to transmit information 250 to the communication equipment 51 associated with the PSAP to establish the emergency phone call between the VoIP phone $15_j$ and the communication equipment 51. In addition to serving to establish the emergency phone call, the information 250 includes the location information 23 indicative of the physical location of the end-user premise $18_j$ in order to allow the PSAP to know where the emergency phone call originates from.

Once the information 250 is received by the communication equipment 51, an operator of the PSAP can answer the emergency phone call and be presented (e.g., on a display) with the physical location of the end-user premise $18_j$ from which the emergency call originates.

The user 11 and the operator of the PSAP can communicate and take any necessary action to address the situation. More particularly, the communication apparatus $20_j$ may transmit information 220 pertaining to the emergency phone call over the communications network 12 via the wireless communications link 85, the communication apparatus $20_i$ and the communication link $21_i$. The information 220 can include information transmitted by the VoIP phone $15_j$, which may include voice information provided by the user 11 during the call, and possibly call control information to maintain the call in progress.

In the other direction, information 230 pertaining to the emergency call and arriving over the communications network 12 may be routed to the communication apparatus $20_j$ via the communication link $21_i$, the communication apparatus $20_i$ and the wireless communications link 85. For example, the information 230 may include voice information provided by the operator of the PSAP during the call and possibly call control information to maintain the call in progress.

Thus, information pertaining to the emergency phone call (such as the information 240, 220, 230) can be exchanged between the communications network 12 and the communication apparatus $20_i$ by "piggybacking" this information on the communications link $21_i$. In this way, the emergency phone call can still be effected by the user 11 despite the disruption of the communication link $21_j$. This allows the user 11 to seek help from police, fire and/or ambulance services, which can be dispatched to the end-user premise $18_j$ whose location has been provided to the PSAP.

In some embodiments, the wireless communication link 85 may remain established between the communication apparatus $20_j$ and the communication apparatus $20_i$ until the emergency phone call is terminated. Upon determining that the emergency phone call is terminated, the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

In other embodiments, the wireless communication link 85 may remain established between the communication apparatus $20_j$ and the communication apparatus $20_i$ until the disruption to the communication link $21_i$ is resolved. In other words, the wireless communication link 85 may remain established even after the termination of the emergency phone call placed by the user 11 (e.g., to allow the end-user equipment $10_j$ to make other telephone calls and/or other communications, and/or to allow incoming calls and/or other incoming communications to reach the end-user premise $18_j$). When the disruption to the communication link $21_j$ is resolved, the wireless communication link 85 becomes unnecessary and may be disestablished (i.e., terminated). To determine when the communication link $21_j$ is no longer disrupted (i.e., is operating normally once again), the communication apparatus $20_j$ may verify the state of the communication link $21_j$. For example, this verification may be carried out periodically by the communication apparatus $20_j$, possibly more frequently while the communication link $21_j$ is disrupted, in order to detect when the communication link $21_j$ is no longer disrupted. As mentioned above, the state of the communication link $21_j$ may be verified using an exchange of signals between the communication apparatus $20_j$ and the communications network 12. When such an exchange of signals results in the proper criteria being met, the communication apparatus $20_j$ can deem the state of the communication link $21_j$ as being normal (i.e., non-disrupted) once again. Upon concluding that the state of the communication link $21_j$ is once again normal, the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

While in the example presented above the ability of the end-user equipment $10_j$ to communicate via the communication link $21_j$ is disrupted due to a disruption to the communication link $21_j$ itself, similar operations may occur when the ability of the end-user equipment $10_j$ to communicate via the communication link $21_j$ is disrupted due to some other reason, such as a defective or inoperative software or hardware component of the end-user equipment $10_j$ (e.g., the modem 60) normally used to effect communications over the communication link $21_j$.

Also, while the example presented above involved a telephone call initiated by the user 11 using the VoIP phone $15_j$, similar operations may occur for other types of communications having certain destinations that are originated using the end-user equipment $10_j$ at the end-user premise $18_j$. For example, if an alarm system device (e.g., a detector, a controller) of the alarm system $17_j$ originates an alarm system communication destined for an alarm monitoring central while the ability of the end-user equipment $10_j$ to communicate via the communication link $21_j$ is disrupted and the destination of the alarm system communication (e.g., a telephone number, IP address or other identifier of communication equipment associated with the alarm monitoring central) is specified by the communication destination information 45 included in the database 66, information pertaining to the alarm system communication may be conveyed over the communications network 12 via the communication apparatus $20_j$, the wireless communication link 85, the communication apparatus $20_i$ and the communication link $21_i$. Other types of communications, such as accesses to data network sites, having certain destinations can be effected in a similar manner.

It will thus be appreciated that, in this embodiment, interaction between the communication apparatus $20_j$ at the end-user premise $18_j$ and the communication apparatus $20_i$ at the end-user premise $18_i$ provides a failover mechanism enabling the end-user equipment $10_j$ at the end-user premise $18_j$ to continue to be able to effect telephone calls, accesses to data network sites, alarm system communications, and/or other communications having certain destinations over the communications network 12, despite the ability of the end-user equipment $10_j$ to communicate via the communication link $21_j$ being disrupted, by "piggybacking" on the communication link $21_i$ reaching the end-user premise $18_i$. In this way, telephone, data network (e.g., Internet), alarm system, television and/or other communication services may continue to be provided to the subscriber associated with the end-user premise $18_j$ in an uninterrupted fashion to allow emergency or otherwise particularly important communications to be effected, regardless of the ability of the end-user equipment $10_j$ to communicate via the communication link $21_j$ reaching the end-user premise $18_j$.

The failover mechanism contemplated herein may be implemented in various other ways in other embodiments.

For example, in some embodiments, one or more end-user devices of the end-user equipment $10_x$ at the end-user premise $18_x$ may have wireless capabilities that can be exploited to implement the failover mechanism contemplated herein.

Figure 6A:
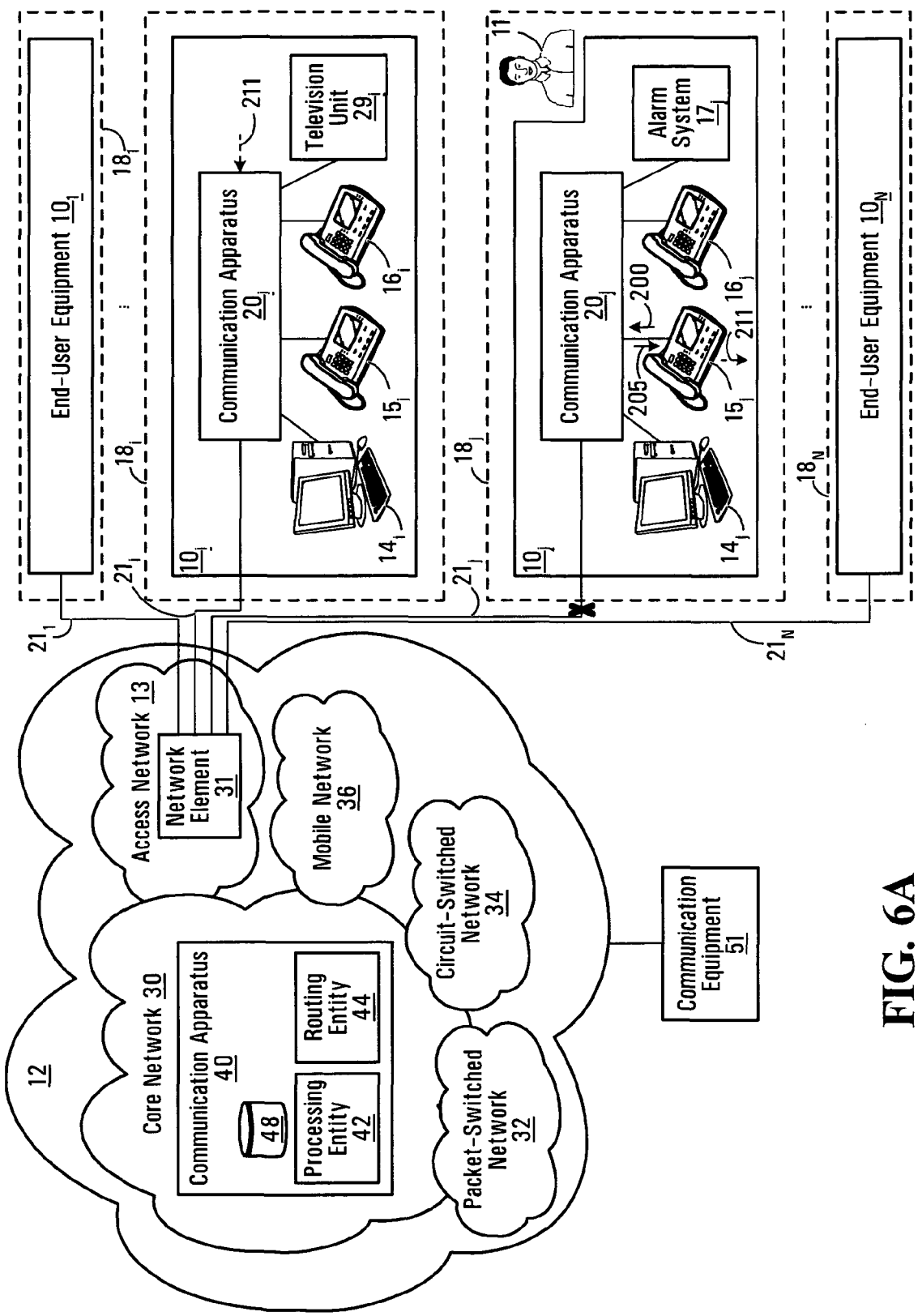
FIGS. 6A and 6B show a variant to the example considered in FIGS. 5A and 5B.

With reference to FIG. 6A, a variant to the example considered above will be discussed in which it is assumed that the VoIP phone $15_j$ used by the user 11 to place the telephone call is a wireless VoIP phone (e.g., a WiFi phone).

As in the example considered above, when the user 11 initiates the telephone call using the VoIP phone $15_j$, the communication apparatus $20_j$ receives the information 200 from the VoIP phone $15_j$ conveying the request for the telephone call and including the telephone number, SIP data or other information identifying the telephone of the communication equipment 51 for which the telephone call is destined. Also as in the example considered above, the communication apparatus $20_j$, upon verifying the state of the communication link $21_j$, determines that the communication link $21_j$ is disrupted (i.e., not operating normally). Also as in the example considered above, the communication apparatus $20_j$, upon determining that telephone number being called and specified by the information 200 corresponds to the emergency telephone number "911" specified by the communication destination information 45 in the database 66, determines that the emergency phone call is to be effected over the communications network 12 despite the communication link $21_j$ being disrupted.

Thus, the processing entity 54 of communication apparatus $20_j$ attempts to find another way to effect the emergency phone call initiated by the user 11 using the VoIP phone $15_j$ over the communications network 12. More particularly, the communication apparatus $20_j$ attempts to implement a failover mechanism in which it attempts to establish a wireless communication link allowing it to effect the emergency call by routing the call to the communications network 12 via this wireless communication link and another one of the communications links $21_1$-$21_N$.

The processing entity 54 of the communication apparatus $20_j$ accesses the database 66 of the communication apparatus $20_i$ to obtain the end-user equipment information 43 regarding end-user equipment at one or more other ones of the end-user premises $18_1$-$18_N$ that is within wireless range of the end-user equipment $10_j$ at the end-user premise $18_j$.

As in the example considered above, in this variant example, it is assumed that the end-user equipment information 43 in the database 66 of the communication apparatus $20_j$ includes an identifier of the communication apparatus $20_i$ (e.g., a MAC address, EHA, or other hardware identifier of the communication apparatus $20_i$, an IP address assigned to the communication apparatus $20_i$, a URI (e.g., a SIP URI) identifying the communication apparatus $20_i$, or any other information that identifies the communication apparatus $20_i$) and access information to be provided to the communication apparatus $20_i$ in order to make use of the communication apparatus $20_i$ (e.g., a password or a wireless network key).

The processing entity 54 of the communication apparatus $20_j$ retrieves the identifier and access information of the communication apparatus $20_i$. In the embodiment considered above, the communication apparatus $20_i$ uses this identifier and access information to establish the wireless communication link 85 between itself and the communication apparatus $20_i$. In this variant, however, the communication apparatus $20_j$ attempts to establish a wireless communication link between the VoIP phone $15_j$ and the communication apparatus $20_i$ instead.

More particularly, the routing entity 62 of the communication apparatus $20_j$ transmits information 205 to the VoIP phone $15_j$. The information 205 includes the identifier and access information for the communication apparatus $20_i$ retrieved from the database 66 as well as an indication to establish a wireless communication link between itself, i.e., the VoIP phone $15_j$, and the communication apparatus $20_i$.

Upon receipt of the information 205, the VoIP phone $15_j$ wirelessly sends information 211 to the communication apparatus $20_i$. The information 211 includes the identifier and access information of the communication apparatus $20_i$ that was retrieved from the database 66 by the communication apparatus $20_j$. In this example, the information 211 also includes an identifier of the VoIP phone $15_j$ (e.g., a MAC address, EHA, or other hardware identifier of the VoIP phone $15_j$, an IP address assigned to the VoIP phone $15_j$, or any other information that identifies the VoIP phone $15_j$) and may also include access information to be provided to the VoIP phone $15_j$ in order to make use of the VoIP phone $15_j$ (e.g., a password or a wireless network key).

When it receives the information 211, the communication apparatus $20_i$ attempts to validate the identifier and access information of the communication apparatus $20_i$ that are included in the information 211. More particularly, the processing entity 54 of the communication apparatus $20_i$ verifies whether the identifier and access information of the communication apparatus $20_i$ that are included in the information 211 correspond to the identifier and access information of the communication apparatus $20_i$ that are included in the end-user equipment information 41 in the database 66 of the communication apparatus $20_i$. If not, the communication apparatus $20_i$ may deny the request of the VoIP phone $15_j$ to access the communication apparatus $20_i$ and may take some other action. For instance, the communication apparatus $20_i$ may send information back to the VoIP phone $15_j$ indicating that access to the communication apparatus $20_i$ is denied, and/or may send information to the communication apparatus 40 of the core network 30 to indicate that a failed connection attempt has occurred due to invalid credentials.

Figure 6B:
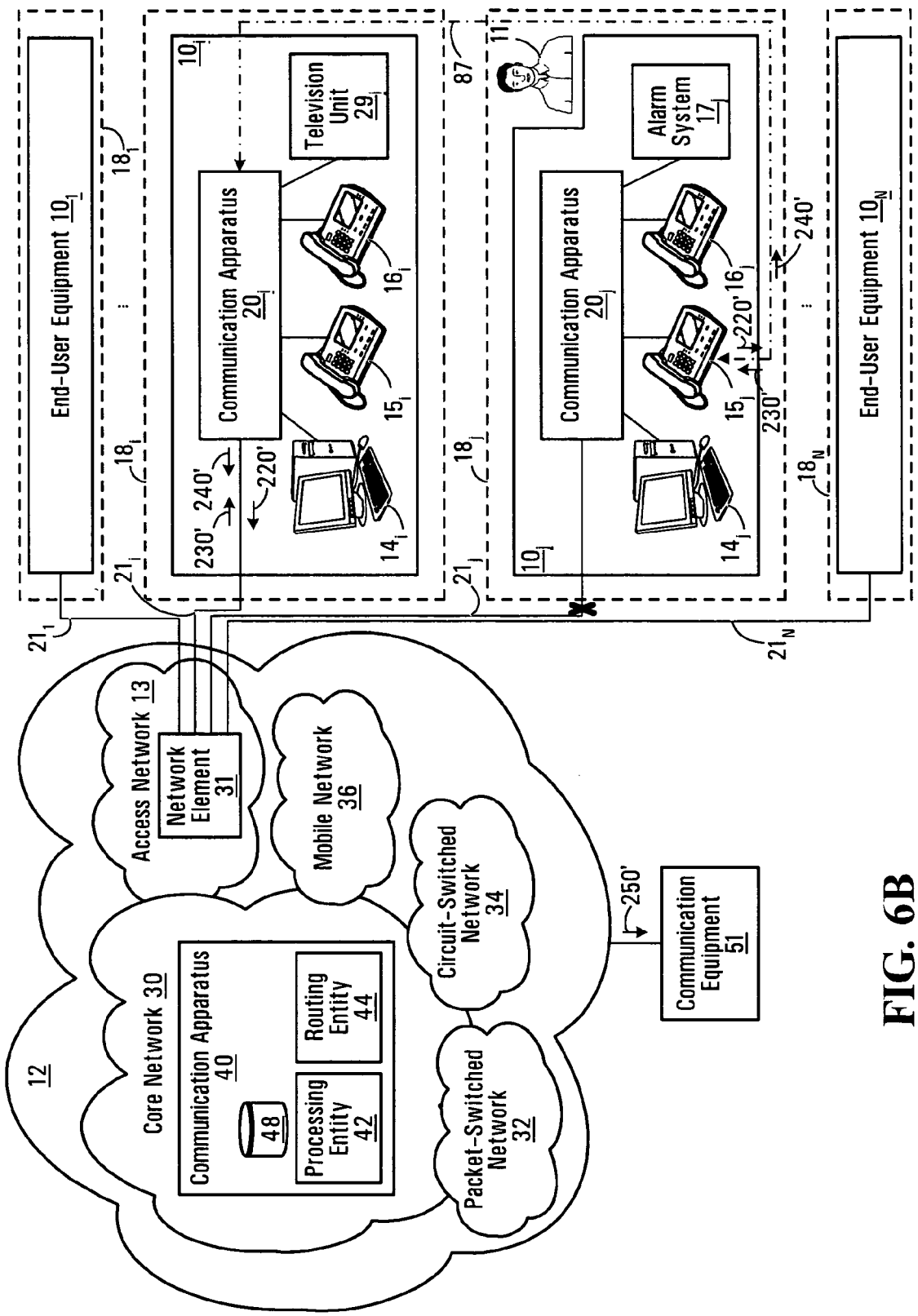

In this example, it is assumed that the identifier and access information of the communication apparatus $20_i$ that are included in the information 211 indeed correspond to the identifier and access information of the communication apparatus $20_i$ that are included in the end-user equipment information 41 in the database 66 of the communication apparatus $20_i$. Therefore, as shown in FIG. 6B, the communication apparatus $20_i$ grants access to the VoIP phone $15_j$, resulting in establishment of a wireless communications link 87 between the VoIP phone $15_j$ and the communication apparatus $20_i$.

With the wireless communication link 87 being established, the VoIP phone $15_j$ may proceed to effect the emergency phone call requested by the user 11 using the VoIP phone $15_j$ over the communications network 12 despite the disruption to the communication link $21_j$.

More particularly, the VoIP phone $15_j$ transmits information 240' pertaining to the emergency phone call to the communications network 12 via the wireless communication link 87, the communication apparatus $20_i$ and the communication link $21_i$. In this example, the information 240' includes the emergency telephone number "911" called using the VoIP phone $15_j$. Also, in this example, the information 240' includes the identifier of the VoIP phone $15_j$ and the identifier of the communication apparatus $20_j$, which may be known by the VoIP phone $15_j$ due to its connection to the communication apparatus $20_j$ (and/or which may have been included in the information 205 received by the VoIP phone $15_j$). The information 240' may also include other call control information that may be needed to establish the emergency phone call.

The communication apparatus 40 of the core network 30 receives the information 240'. The processing entity 42 of the communication apparatus 40 determines, based on the emergency telephone number "911" included in the information 240, that the emergency phone call is destined for the communication equipment 51 associated with the PSAP. The processing entity 42 accesses the database 48 to search for a given one of the records $200_1$-$200_N$ in which the end-user equipment information 27 includes an identifier corresponding to the identifier of the VoIP phone $15_j$ and/or an identifier corresponding to the identifier of the communication apparatus $20_j$ included in the information 240'. In this example, the processing entity 42 finds the record $200_j$, which is associated with the subscriber to which the service provider provides communication services to the end-user premise $18_j$ and in which the end-user equipment information 27 includes the identifier of the VoIP phone $15_j$ and/or the identifier of the communication apparatus $20_j$.

Upon finding the record $200_j$, the processing entity 42 retrieves the location information 23 included in the record 200 and indicative of the physical location of the end-user premise $18_j$ (e.g., a civic address and/or a set of geo-coordinates). The processing entity 42 proceeds to cause the routing entity 44 of the communication apparatus 40 to transmit information 250' to the communication equipment 51 associated with the PSAP to establish the emergency phone call between the VoIP phone $15_j$ and the communication equipment 51. In addition to serving to establish the emergency phone call, the information 250' includes the location information 23 indicative of the physical location of the end-user premise $18_j$ in order to allow the PSAP to know where the emergency call originates from.

Once the information 250' is received by the communication equipment 51, an operator of the PSAP can answer the emergency phone call and be presented (e.g., on a display) with the physical location of the end-user premise $18_j$ from which the emergency call originates.

The user 11 and the operator of the PSAP can communicate and take any necessary action to address the situation. More particularly, the VoIP phone $15_j$ may transmit information 220' pertaining to the emergency phone call to the communications network 12 via the wireless communication link 87, the communication apparatus 20; and the communication link $21_i$. The information 220' may include voice information provided by the user 11 during the call and possibly call control information to maintain the call in progress.

In the other direction, information 230' pertaining to the emergency phone call and arriving over the communications network 12 may be routed to the VoIP phone $15_j$ via the communication link $21_i$, the communication apparatus $20_i$ and the wireless communication link 87. The information 230' may include voice information provided by the operator of the PSAP during the call and possibly call control information to maintain the call in progress.

Thus, information pertaining to the emergency phone call (such as the information 240', 220' and 230') can be exchanged between the communications network 12 and the VoIP phone $15_j$ by "piggybacking" this information on the communication link $21_i$. In this way, the emergency phone call can still be effected by the user 11 despite the disruption of the communication link $21_j$. This allows the user 11 to seek help from police, fire and/or ambulance services, which can be dispatched to the end-user premise $18_j$ whose location has been provided to the PSAP.

While this embodiment illustrates one way in which the failover mechanism contemplated herein may be implemented using wireless capabilities of one or more end-user devices of the end-user equipment $10_x$ at the end-user premise $18_x$, such wireless capabilities may be exploited in other ways in other embodiments to implement the failover mechanism.

For example, in some embodiments, when the ability of the end-user equipment $10_x$ to communicate via the communication link $21_x$ reaching the end-user premise $18_x$ is determined to be disrupted, the communication apparatus $20_x$ at the end-user premise $18_x$ may establish a wireless communication link with a wireless-enabled end-user device that is part of the end-user equipment $10_y$ at the end-user premise $18_y$ rather than with the communication apparatus $20_y$ directly. For instance, in the example considered above, the communication apparatus $20_j$ at the end-user premise $18_j$ may establish a wireless communication link between itself and the computer $14_i$, the VoIP phone $15_i$, or the VoIP phone $16_i$ (using an identifier and possibly access information for that end-user device retrieved from the database 66 of the communication apparatus $20_j$), such that information pertaining to the telephone call requested by the user 11 using the VoIP phone $15_j$ may be exchanged between the VoIP phone $15_j$ and the communication network 12 via this wireless communication link, the communication apparatus $20_i$ and the communication link $21_i$.

As another example, in some embodiments, when the ability of the end-user equipment $10_x$ to communicate via the communication link $21_x$ reaching the end-user premise $18_x$ is determined to be disrupted, the communication apparatus $20_x$ at the end-user premise $18_x$ may establish a wireless communication link between a wireless-enabled end-user device that is part of the end-user equipment $10_x$ and a wireless-enabled end-user device that is part of the end-user equipment $10_y$ at the end-user premise $18_y$. For instance, in the example considered above, the communication apparatus $20_j$ at the end-user premise $18_j$ may establish a wireless communication link between the VoIP phone $15_j$ and the computer $14_i$, the VoIP phone $15_i$, or the VoIP phone $16_i$ (using an identifier and possibly access information for that end-user device retrieved from the database 66 of the communication apparatus $20_j$), such that information pertaining to the telephone call requested by the user 11 using the VoIP phone $15_j$ may be exchanged between the VoIP phone $15_j$ and the communication network 12 via this wireless communication link, the communication apparatus $20_i$ and the communication link $21_i$.

The embodiments considered above illustrate that, in some cases, it is useful or necessary for the communications network 12 and/or the communication equipment 51 for which a communication is destined to know the physical location from which the communication originates. Although in the embodiments considered above, the physical location from which the communication originates is derived by the communication apparatus 40 of the core network 30 by consulting the database 48 on a basis of an identifier of a piece of equipment of the end-user equipment $10_x$ used to originate the communication (e.g., the identifier of the VoIP phone $15_j$ or the identifier of the communication apparatus $20_j$ in the example considered above), this physical location may be derived in various other ways in other embodiments.

For example, in some embodiments, information transmitted by a piece of equipment of the end-user equipment $10_x$ used to originate a communication may include location information indicative of the physical location of the end-user premise $18_x$ from which the communication originates. For instance, the database 66 of the communication apparatus $20_x$ at the end-user premise $18_x$ may include location information indicating the physical location of the end-user premise $18_x$, such as a civic address, a set of geo-coordinates, and/or any other information that indicates the physical location of the end-user premise $18_x$. This location information may be provided in the database 66 in various ways. For example, in some cases, this location information may be provided in the database 66 by a user at the end-user premise $18_x$ when setting up the communication apparatus $20_x$. In other cases, this location information may be provided in the database 66 by the service provider, for instance, by the communication apparatus 40 transmitting this location information via the communication link $21_x$. In such embodiments, the location information included in the database 66 of the communication apparatus $20_x$ may be transmitted to the communications network 12 to allow it and/or the communication equipment 51 to know the physical location of the end-user premise $18_x$ from which the communication originates (e.g., in the example considered above, the location information included in the database 66 may be included in the information 240, 240' transmitted by the end-user equipment $10_j$).

As another example, in some embodiments, the physical location of the end-user premise $18_x$ from which a communication originates may be determined using triangulation techniques (e.g., multilateration or trilateration). For instance, location algorithms may determine the physical location of the end-user premise $18_x$ based on three or more times of arrival of a signal wirelessly transmitted by a piece of equipment of the end-user equipment $10_x$ (e.g., the communication apparatus $20_x$) at three (3) or more wireless receivers having known locations that are distributed among the end-user equipment $10_1$-$10_N$ at the end-user premises $18_1$-$18_N$ and/or equipment at various other places. Such triangulation techniques, which can be based on times of arrival either explicitly (i.e., on the times of arrival themselves) or implicitly (i.e., on differences between the times of arrival), are well known and need not be described here. An example of a system enabling such location capabilities is the Wi-Fi Positioning System (WPS) provided by Skyhook Wireless Inc. and described at http://www.skyhookwireless.com/, which is hereby incorporated by reference herein.

Thus, using triangulation techniques, a "location" database including location information indicating the physical locations of the end-user equipment $10_1$-$10_N$ at the end-user premises $18_1$-$18_N$ (and possibly equipment at various other places) can be created and maintained by the service provider serving the end-user premises $18_1$-$18_N$ or by another party. The location database may associate the location information indicating the physical location of the end-user equipment $10_x$ to an identifier of a piece of equipment of the end-user equipment $10_x$ (e.g., the identifier of the communication apparatus $20_x$). In such embodiments, upon receiving an identifier of a piece of equipment of the end-user equipment $10_x$ which originates a communication (e.g., in the example considered above, the identifier of the communication apparatus $20_j$ included in the information 240, 240' transmitted by the end-user equipment $10_j$), the communication apparatus 40 may obtain the location information indicating the physical location of the end-user premise $18_x$ from the location database on a basis of this identifier, either by having the processing entity 42 access the location database if it is managed by the service provider or by communicating with equipment of another party managing the location database. Once obtained, the location information indicating the physical location of the end-user premise $18_x$ may be used by the communication apparatus 40 and/or transmitted to the communication equipment 51 to know the physical location of the end-user premise $18_x$ from which the communication originates.

While in the embodiments considered above the communication apparatus 40 of the core network 30 may derive the physical location from which the communication originates, in other embodiments, this physical location may be derived by an emergency call processing platform of the core network 30 or of the PSAP itself using any of the aforementioned methods.

In the embodiments considered above, when the ability of the end-user equipment $10_x$ to communicate via the communication link $21_x$ is disrupted and a request for a communication originated by the end-user equipment $10_x$ is received, the processing entity 54 of the communication apparatus $20_x$ determines, based on a destination of the communication, whether the communication is to be effected by determining whether the destination of the communication corresponds to a predetermined destination specified by the communication destination information 45 in the database 66 of the communication apparatus $20_x$. The processing entity 54 of the communication apparatus $20_x$ may make such a determination in various other ways in other embodiments.

For example, in some embodiments, the processing entity 54 of the communication apparatus $20_x$ may determine, based on the destination of a communication, that the communication is to be effected over the communications network 12 despite the ability of the end-user equipment $10_x$ to communicate via the communication link $21_x$ being disrupted by determining that the destination of the communication corresponds to a predetermined destination specified in a processing logic implemented by the processing entity 54. For instance, the processing logic implemented by the processing entity 54 may include one or more conditional statements checking whether the destination of the communication corresponds to a predetermined destination (e.g., "if telephone number called is 911, then effect telephone call").

As another example, in some embodiments, the processing entity 54 of the communication apparatus $20_x$ may determine, based on the destination of a communication, that the communication is to be effected over the communications network 12 despite the ability of the end-user equipment $10_x$ to communicate via the communication link $21_x$ being disrupted by receiving an indication that the destination of the communication is associated with a requirement to effect the communication over the communications network 12. More particularly, rather than determining whether the destination of the communication corresponds to a predetermined destination (e.g., specified in the database 66 or in its processing logic), the processing entity 54 may receive an indication that the destination is to be effected over the communications network 12 because of its destination. For instance, an end-user device of the end-user equipment $10_x$ which transmits to the communication apparatus $20_x$ information conveying a request for a communication may include in this information an indication that the destination is to be effected over the communications network 12 because of its destination (e.g., in the example considered above, the VoIP phone $15_j$ may be configured to determine that the user 11 has called the emergency telephone number "911" and proceed to include in the information 200 transmitted to the communication apparatus $20_x$ an indication that the requested emergency call is to be effected over the communications network 12). The indication may be a flag or other code having an assigned meaning which, when received by the processing entity 54, results in the processing entity 54 determining that the communication is to be effected over the communications network 12 despite the ability of the end-user equipment $10_x$ to communicate via the communication link $21_x$ being disrupted.

In the embodiments considered above, the communication apparatus $20_x$ at the end-user premise $18_x$ determines that the ability of the end-user equipment $10_x$ to communicate via the communication link $21_x$ reaching the end-user premise $18_x$ is disrupted (i.e., not normal) and proceeds to establish a wireless communication link between the end-user equipment $10_x$ at the end-user premise $18_x$ and the end-user equipment $10_y$ at the end-user premise $18_y$. In other embodiments, such functions may be implemented by other pieces of equipment of the end-user equipment $10_x$ at the end-user premise $18_x$ and/or of the communications network 12.

For example, in some embodiments, a given end-user device (e.g., a phone, computer, or alarm system device) at the end-user premise $18_x$ may itself determine that the ability of the end-user equipment $10_x$ to communicate via the communication link $21_x$ is disrupted (i.e., not normal) and may proceed to implement the failover mechanism contemplated herein. In such embodiments, the given end-user device constitutes an apparatus implementing a processing entity and a routing entity operating in a manner similar to the processing entity 54 and the routing entity 62 of the communication apparatus $20_x$ in connection with the failover mechanism contemplated herein. For instance, in a variant to the example considered above, the wireless VoIP phone $15_j$ may determine that the communication apparatus $20_j$ is inoperative or malfunctioning or that the communication link $21_j$ is down (e.g., based on signals or lack of signals between the VoIP phone $15_j$ and the communication apparatus $20_j$). In such a variant, the wireless VoIP phone $15_j$ may store the identifier and access information of the communication apparatus $20_i$ in memory or request them from the database 66 of the communication apparatus $20_j$ and may use this information to establish a wireless communication link (such as the wireless communication link 87) in a manner similar to that described above.

As another example, in some embodiments, a disruption of the ability of the end-user equipment $10_x$ to communicate via the communication link $21_x$ may be determined by an apparatus of the communication network 12 (such as the communication apparatus 40 or the network element 31).

For instance, in one embodiment, the communications network 12 (and more particularly, the access network 13 or the core network 30) sends "heartbeat" signals to each of the communication apparatuses $20_1$-$20_N$ via the communication links $21_1$-$21_N$. When the communication link $21_x$ reaching the end-user premise $18_x$ and the communication apparatus $20_x$ at the end-user premise $18_x$ are operating normally, the communication apparatus $20_x$ receives a heartbeat signal from the communications network 12 and acknowledges its receipt by replying with a similar signal.

Because the communications network 12 sends the heartbeat signals to each of the communications apparatuses $20_1$-$20_N$ via the communication links $21_1$-$21_N$, the communications network 12 is able to identify potential disruptions to the respective abilities of the end-user equipment $10_1$-$10_N$ to communicate via these communication links by looking for certain ones of these communications apparatuses that have not replied to these heartbeat signals. Such a disruption may be determined by one or more components of the communications network 12, such as the network element 31 or another apparatus of the access network 13 and/or the communication apparatus 40 or another apparatus of the core network 30.

For instance, consider a variant to the example considered previously in which it is assumed that the communications network 12, and more particularly, the communication apparatus 40, identifies the disruption of the communication link $21_j$ reaching the end-user premise $18_j$ because "heartbeat" signals sent to the communication apparatus $20_j$ go unacknowledged. Further assume that the communication apparatus $20_j$ does not determine that the link $21_j$ is disrupted.

This results in a situation where the end-user equipment $10_j$ may not be able to effect telephone calls, accesses to data network sites, alarm system communications, and/or other communications since the communication apparatus $20_j$ has not determined that the communication link $21_j$ is disrupted. In particular, this may present risks, especially if the user 11 or someone else at the end-user premise $18_j$ needs to effect an important or emergency (e.g., 911) call to alert civic services (such as fire, police and ambulance services) or if the alarm system $17_j$ needs to effect an alarm system communication potentially indicative of an undesirable event (e.g., an intrusion or a fire at the end-user premise $18_x$). Also, the end-user equipment $10_j$ may be unable to receive incoming calls and/or other incoming communications.

To address this situation, in this embodiment, the communication apparatus 40 can try to alert the communication apparatus $20_j$ to the disruption of the communication link $21_j$ using the failover mechanism contemplated herein. For example, the communication apparatus 40 may try to contact the communication apparatus $20_j$ using the communication apparatus $20_i$ at the end-user premise $18_i$.

More particularly, in this embodiment, the processing entity 42 of the communication apparatus 40 retrieves the identifier and access information of the communication apparatus $20_j$ from the database 48 (which, in this embodiment, includes this access information). Once the processing entity 42 has performed this retrieval, the routing entity 44 of the communication apparatus 40 causes information including the identifier and access information of the communication apparatus $20_j$ to be transmitted to the communication apparatus $20_i$ via the communication link $21_i$. Alternatively, the processing entity 42 may cause the routing entity 44 to transmit to the communication apparatus $20_i$ via the communication link $21_j$ information instructing the processing entity 54 of the communication apparatus $20_i$ to retrieve the identifier and access information of the communication apparatus $20_j$ from the database 66 of the communication apparatus $20_i$. In any event, the information transmitted to the communication apparatus $20_i$ also includes an indication for the communication apparatus $20_i$ to establish a wireless communication link between itself and the communication apparatus $20_j$.

Upon receiving the information, the communication apparatus $20_i$ proceeds to establish a wireless communication link between itself and the communication apparatus $20_j$ using the identifier and access information of the communication apparatus $20_j$. With this wireless communication link being established, when incoming and/or outgoing telephone calls, accesses to data network sites, alarm system communications, and/or other communications having certain destinations are to be effected using the end-user equipment $10_j$ at the end-user premise $18_j$, the communication apparatus $20_j$ proceeds to exchange information pertaining to these communications over the communications network 12 via the established wireless communication link, the communication apparatus $20_i$ and the communications link $21_i$ in a manner similar to that described previously herein.

Thus, an apparatus of the communications network 12 (such as the communication apparatus 40 or the network element 31) may be able to identify disruptions of the respective abilities of the end-user equipment $10_1$-$10_N$ to communicate via the communications links $21_1$-$21_N$ and implement failover operations to allow the end-user equipment $10_1$-$10_N$ at the end-user premises $18_1$-$18_N$ to continue to be used to effect communications having certain destinations despite these disruptions.

Also, by having the communications network 12 manage certain aspects of the failover mechanism contemplated herein, the communications network 12 may use other information at its disposal to manage these aspects. For example, when the ability of the end-user equipment $10_x$ to communicate via the communication link $21_x$ reaching the end-user premise $18_x$ is determined to be disrupted, the communications network 12 may evaluate the current network traffic load being experienced by individual ones of the communication apparatuses $20_1$-$20_N$ within the particular geographic area around the end-user premise $18_x$. This evaluation may allow the communications network 12 to identify opportunities arising from "piggybacking" information onto one or more of the communications links $21_1$-$21_N$ that are currently experiencing low network traffic loads and therefore have more available resources than those links experiencing high network traffic loads. This may allow the failover mechanism to be used more efficiently among the communications apparatuses $20_1$-$20_N$ within a geographic area, possibly ensuring a higher and more consistent level of service to all users within this area. For instance, assume that the communication network 12 identifies the communication apparatuses $20_y$ and $20_z$ as two (2) apparatuses with acceptable signal strength proximate to the communication apparatus $20_x$ of the end-user equipment $10_x$ whose ability to communicate via the communication link $21_x$ is determined to be disrupted, with the communication apparatus $20_y$ currently experiencing a high network traffic load due to several ongoing communications made by the end-user equipment $10_y$ at the end-user premises $18_y$ while the communication apparatus $20_z$ is experiencing a very low traffic load since few or no communications are being made by the end-user equipment $10_z$ at the end-user premise $18_z$. In such a case, the communications network 12 may direct the communication apparatus $20_z$ to establish a wireless communications link with the communication apparatus $20_x$ since the communication apparatus $20_z$ and thus the communication link $21_z$ provides a greater capacity. In addition to or alternatively to considering network traffic loads, other factors may be taken into consideration by the communications network 12 to determine with which of the end-user equipment $10_1$-$10_N$ the end-user equipment $10_x$ is to establish a wireless communication link, such as reported signals strengths of signals exchanged between the end-user equipment $10_1$-$10_N$. In some embodiments, the end-user equipment $10_x$ at the end-user premise $18_x$ may use a private network address space for one or more end-user devices of the end-user equipment $10_x$, while the communication apparatus $20_x$ may communicate via the communication link $21_x$ using a public network address space. For example, the communication apparatus $20_x$ may be assigned a public IP address by the communications network 12 (e.g., by the communication apparatus 40 of the core network 30) and the one or more end-user devices of the end-user equipment $10_x$ may be assigned private IP addresses by the communication apparatus $20_x$. In such embodiments, the routing entity 62 of the communication apparatus $20_x$ performs a network address translation (NAT) process on data packets passing therethrough to translate their addresses from the private network address space to the public network address space, and vice versa.

When the failover mechanism contemplated herein is invoked in these embodiments, in cases where a wireless communication link is established between the communication apparatus $20_x$ at the end-user premise $18_x$ and the communication apparatus $20_y$ at the end-user premise $18_y$, the NAT process performed by the communication apparatus $20_x$ and, if applicable, the NAT process performed by the communication apparatus $20_y$ can take into account the establishment of the wireless communication link in order to avoid potential private network address clashes.

For example, considering the previous example discussed in connection with FIGS. 5A and 5B where the wireless communication link 85 is established between the communication apparatus $20_j$ at the end-user premise $18_j$ and the communication apparatus $20_i$ at the end-user premise $18_i$ upon the user 11 initiating the telephone call while the communication link $21_j$ is disrupted, it is assumed that (prior to the wireless communication link 85 being established) the computer $14_j$, the VoIP phone $15_j$, an ATA associated with the POTS phone $16_j$, and the alarm system devices of the alarm system $17_j$ are assigned private IP addresses by the communication apparatus $20_j$ which is itself assigned a public IP address by the communications network 12, and that the computer $14_i$, the VoIP phone $15_i$, the VoIP phone $16_i$ and the television unit $29_i$ are assigned private IP addresses by the communication apparatus $20_i$ which is itself assigned a public IP address by the communications network 12. More particularly, for purposes of this example, assume that the public IP address assigned to the communication apparatus $20_j$ is "122.1.17.6", the private IP address assigned to the VoIP phone $15_j$ is "10.2.2.9", and the public IP address assigned to the communication apparatus $20_i$ is "122.28.5.18".

In establishing the wireless communication link 85, the routing entity 62 of the communication apparatus $20_i$ assigns a private IP address to the communication apparatus $20_j$, say "10.50.50.3" for purposes of this example. In other words, the communication apparatus $20_j$ can be viewed as becoming part of the private network address space used by the end-user equipment $10_1$ at the end-user premise $18_i$. The routing entity 62 of the communication apparatus $20_j$ takes note of the private IP address "10.50.50.3" assigned to it by the communication apparatus $20_i$.

Upon receiving data packets transmitted by the VoIP phone $15_j$ which have the private IP address "10.2.2.9" as their source address, the routing entity 62 of the communication apparatus $20_j$ performs the NAT process on these data packets. As part of the NAT process, the routing entity 62 notes destination addresses and possibly destination ports of the data packets in a database (e.g., a connection state table) and sends to the communication apparatus $20_i$ modified versions of the data packets such that they have the private IP address "10.50.50.3" as their source address.

The routing entity 62 of the communication apparatus $20_i$ receives the data packets transmitted by the communication apparatus $20_j$ which have the private IP address "10.50.50.3" as their source address and proceeds to perform the NAT process on these data packets. As part of the NAT process, the routing entity 62 notes destination addresses and possibly destination ports of the data packets in a database (e.g., a connection state table) and sends over the communications network 12 via the communication link $21_i$ modified versions of the data packets such that they have the public IP address "122.28.5.18" as their source address.

In the reverse direction, when the communication apparatus $20_i$ receives via the communication link $21_i$ data packets pertaining to the telephone call which have the public IP address "122.28.5.18" as their destination address, the routing entity 62 of the communication apparatus $20_i$ performs the NAT process on these data packets by consulting the aforementioned database (e.g., connection state table) based on their source addresses and optionally source ports and sends to the communication apparatus $20_j$ modified versions of these data packets such that they have the private IP address "10.50.50.3" as their destination address.

The routing entity 62 of the communication apparatus $20_j$ receives the data packets transmitted by the communication apparatus $20_i$ which have the private IP address "10.50.50.3" as their destination address and proceeds to perform the NAT process on these data packets by consulting the aforementioned database (e.g., connection state table) based on their source addresses and optionally source ports. This results in the routing entity 62 sending to the VoIP phone $15_j$ modified versions of the data packets such that they have the private IP address "10.10.2.9" as their destination address.

While the embodiment considered above illustrates one way in which NAT may be taken into account in implementing the failover mechanism contemplated herein, NAT may be taken into account in various other ways in other embodiments. Also, in some embodiments, NAT may not be needed and/or may not be performed (e.g., in cases where an IPv6 addressing scheme is used).

Those skilled in the art will appreciate that, in some embodiments, certain functionality of a given element described herein (e.g., the communication apparatus 40, any piece of equipment of the end-user equipment $10_x$ such as the communication apparatus $20_x$) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the communication apparatus 40, any piece of equipment of the end-user equipment $10_x$ such as the communication apparatus $20_x$) may comprise a processor having access to a memory which stores program instructions for execution by the processor to implement certain functionality of that given element. The program instructions may be stored on data storage media that is fixed, tangible, and readable directly by the processor. The data storage media may store data optically (e.g., an optical disk such as a CD-ROM or a DVD), magnetically (e.g., a hard disk drive, a removable diskette), electrically (e.g., semiconductor memory, floating-gate transistor memory, etc.), and/or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the invention have been described and illustrated, it will be apparent to those skilled in the art that numerous modifications and variations can be made without departing from the scope of the invention, which is defined in the appended claims.

The invention claimed is:

1. A method for effecting communications over a communications network, said method comprising:
receiving a request for a communication originated by first end-user equipment at a first end-user premises, said first end-user equipment including a first communications gateway acting as a communications hub for said first end-user premises and providing communications over said communications network for said first end-user equipment at said first premises, when an ability of the first end-user equipment to communicate over said communications network via said first communications gateway is disrupted;
determining, based on a destination of the communication, that the communication is to be effected over the communications network; and
establishing a wireless communication link between said first communications gateway and a second communications gateway at a second end-user premises, said second communications gateway acting as a hub at the second-end user premises and connecting second end-user equipment at the second end-user premises to the communications network to effect communications by said second end-user equipment over said communications network;
causing information pertaining to the communication to be exchanged between the first end-user equipment and the communications network via said wireless communication link established between the first end-user equipment and said second communications gateway to effect said communications over said network by way of said second communications gateway.

2. A method as claimed in claim 1, comprising determining that the ability of the first end-user equipment to communicate via the first communication link is disrupted.

3. A method as claimed in claim 2, wherein said determining that the ability of the first end-user equipment to communicate via the first communication link is disrupted comprises verifying the ability of the first end-user equipment to communicate via the first communication link.

4. A method as claimed in claim 3, said verifying comprising:
performing a verification of a state of the first communication link based on a signal conveyable via the first communication link; and
determining that the first communication link is disrupted based on a result of the verification.

5. A method as claimed in claim 3, said verifying comprising:
performing a verification of a state of a software or hardware component of the first end-user equipment; and
determining that the software or hardware component of the first end-user equipment is disrupted based on a result of the verification.

6. A method as claimed in claim 2, wherein said determining that the ability of the first end-user equipment to communicate via the first communication link is disrupted comprises receiving information indicative of a disruption of the ability of the first end-user equipment to communicate via the first communication link.

7. A method as claimed in claim 1, said determining comprising determining that the destination of the communication corresponds to a predetermined destination.

8. A method as claimed in claim 1, said determining comprising receiving an indication that the destination of the communication is such that the communication is to be effected over the communications network.

9. A method as claimed in claim 1, the destination of the communication being specified by an identifier of a piece of equipment for which the communication is destined.

10. A method as claimed in claim 9, the identifier comprising at least one of a telephone number, an Internet Protocol (IP) address, and a Uniform Resource Identifier (URI).

11. A method as claimed in claim 9, the identifier comprising at least one of a Media Access Control (MAC) address and an Ethernet hardware address.

12. A method as claimed in claim 1, the destination of the communication being specified by an identifier of a party for which the communication is destined.

13. A method as claimed in claim 1, comprising establishing the wireless communication link between the first end-user equipment and the second end-user equipment.

14. A method as claimed in claim 13, said establishing comprising causing a first one of the first end-user equipment and the second end-user equipment to wirelessly transmit certain information to a second one of the first end-user equipment and the second end-user equipment to establish the wireless communication link.

15. A method as claimed in claim 14, the certain information comprising an identifier of the second end-user equipment.

16. A method as claimed in claim 15, the identifier of the second end-user equipment comprising at least one of a hardware identifier and an IP address.

17. A method as claimed in claim 15, the certain information comprising access information for the second end-user equipment.

18. A method as claimed in claim 17, the access information for the second end-user equipment comprising at least one of a password and a wireless network key.

19. A method as claimed in claim 17, the certain information comprising an identifier of the first end-user equipment.

20. A method as claimed in claim 19, the certain information comprising access information for the first end-user equipment.

21. A method as claimed in claim 13, whereas said causing is performed by said first communications gateway.

22. A method as claimed in claim 21, said establishing comprising wirelessly transmitting certain information to the second communications gateway to establish the wireless communication link between the first communications gateway and the second communications gateway.

23. A method as claimed in claim 22, the second end-user equipment comprising a communication apparatus connected to the second communication link and to an end-user device at the second end-user premises, said wirelessly transmitting comprising wirelessly transmitting the certain information to the communication apparatus of the second end-user equipment to establish the wireless communication link between the communication apparatus of the first end-user equipment and the communication apparatus of the second end-user equipment.

24. A method as claimed in claim 22, the second end-user equipment comprising a communication apparatus connected to the second communication link and to an end-user device at the second end-user premises, said wirelessly transmitting comprising wirelessly transmitting the certain information to the end-user device at the second end-user premises to establish the wireless communication link between the communication apparatus of the first end-user equipment and the end-user device at the second end-user premises.

25. A method as claimed in claim 21, said establishing comprising causing the end-user device at the first end-user premises to wirelessly transmit certain information to the second end-user equipment to establish the wireless communication link between the end-user device at the first end-user premises and the second communications gateway.

26. A method as claimed in claim 1, the information pertaining to the communication comprising information allowing a physical location of the first end-user premises to be identified.

27. A method as claimed in claim 26, the information allowing the physical location of the first end-user premises to be identified comprising location information indicative of the physical location of the first end-user premises.

28. A method as claimed in claim 26, the information allowing the physical location of the first end-user premises to be identified comprising an identifier of a piece of equipment of the first end-user equipment, the identifier being associated in a database with location information indicative of the physical location of the first end-user premises.

29. A method as claimed in claim 1, the communication being a telephone call.

30. A method as claimed in claim 1, the communication being an outgoing communication, said method comprising causing information pertaining to an incoming communication originated by communication equipment connected to the communications network to be exchanged between the first end-user equipment and the communication equipment via the wireless communication link and the second communication link.

31. A method as claimed in claim 30, the incoming communication being an incoming telephone call.

32. A communications gateway at a first end-user premises for effecting communications over a communications network provided by a service provider to said first end-user premises, said communications gateway comprising:
 a processing entity configured to:
  receive a request for a communication originated by first end-user equipment at said first end-user premises when an ability of the first end-user equipment to communicate via a first communication link connecting the first end-user equipment by way of said communications gateway to the communications network is disrupted; and
  determine, based on a destination of the communication, that the communication is to be effected over the communications network;
 a wireless interface for establishing a wireless link between said communications gateway and a second communications gateway at a second end-user premises for effecting communications over said communications network provided by said service provider to said second end-user premises;
 at least one routing entity configured to cause communications from said first end-user equipment at said first premises to be routed over said first communications link when possible, and to cause information pertaining to the communication to be exchanged between the first end-user equipment and the communications network via a wireless communication link established over the wireless interface between the first end-user equipment and said second communications gateway at said second end-user premises and a second communication link connecting the second end-user equipment to the communications network, when an ability of the first end-user equipment to communicate via said first communication link by way of said communications gateway to the communications network is disrupted.

33. A communications gateway as claimed in claim 32, said processing entity is configured to determine that the ability of the first end-user equipment to communicate via the first communication link is disrupted.

34. A communications gateway as claimed in claim 32, said routing entity being configured to establish the wireless communication link between the first end-user equipment and the second end-user equipment.

35. Non-transitory computer-readable media containing a program element executable by a computing system to perform a method for effecting communications over a communications network, said program element comprising:
 program code for causing the computing system to receive a request for a communication originated by first end-user equipment at a first end-user premises, said first end-user equipment including a first communications gateway acting as a communications hub for said first end-user premises equipment at said first premises, when an ability of the first end-user equipment to communicate over said communications network via said first communications gateway is disrupted;
 program code for causing the computing system to determine, based on a destination of the communication, that the communication is to be effected over the communications network; and
 program code for causing the computer system to establish a wireless communication link between said first communications gateway and a second communications gateway at a second end-user premises, said second communications gateway acting as a hub at the second-end user premises and connecting second end-user equipment at the second end-user premises to the communications network to effect communications by said second end-user equipment over said communications network;
 program code for causing the computing system to cause information pertaining to the communication to be exchanged between the first end-user equipment and the communications network via said wireless communication link established between the first end-user equipment and said second communications gateway to effect said communications over said network y way of said second communications gateway.

36. A method for effecting a phone call originated by a telephone at a first end-user premises, the first end-user premises including first communications gateway connected to a communications network via a first communication link, said method comprising:

determining that an ability of the first communications gateway to communicate via the first communication link is disrupted;

determining that the phone call is an emergency phone call;

determining, if the phone call is an emergency phone call, that the phone call is to be effected over the communications network;

establishing a wireless communication link between the first communications gateway and second end-user equipment at a second end-user premises; and causing information pertaining to the emergency phone call to be transmitted to communication equipment associated with an emergency phone call answering point via the wireless communication link and a second communication link connecting the second communications gateway to the communications network.

37. A method as claimed in claim 36, the information pertaining to the emergency phone call comprising information allowing a physical location of the first end-user premises to be identified.

38. A method as claimed in claim 37, the information allowing the physical location of the first end-user premises to be identified comprising location information indicative of the physical location of the first end-user premises.

39. A method as claimed in claim 37, the information allowing the physical location of the first end-user premises to be identified comprising an identifier of a piece of equipment of the first end-user equipment, the identifier being associated in a database with location information indicative of the physical location of the first end-user premises.

40. Apparatus for effecting a phone call originated by a telephone at a first end-user premises, the first end-user premises including first end-user equipment connected to a communications network via a first communication link, said apparatus comprising:

a processing entity configured to:
   determine that an ability of the first end-user equipment to communicate via the first communication link is disrupted;
   determine that the phone call is an emergency phone call; and
   determine, if the phone call is an emergency phone call, that the phone call is to be effected over the communications network; and a wireless interface for establishing a wireless link between said communications gateway and a second communications gateway at a second end-user premises;

a routing entity configured to:
   establish a wireless communication link between the first end-user equipment and second end-user equipment at a second end-user premises; and
   cause information pertaining to the emergency phone call to be transmitted to communication equipment associated with an emergency phone call answering point via the wireless communication link and a second communication link connecting the second end-user equipment to the communications network, when an ability of the first end-user equipment to communicate via a first communication link connecting the first end-user equipment by way of said communications gateway to the communications network is disrupted.

* * * * *